US008098335B2

(12) United States Patent
Kobayashi et al.

(10) Patent No.: US 8,098,335 B2
(45) Date of Patent: *Jan. 17, 2012

(54) NONLINEAR PROCESSING DEVICE AND IMAGE DISPLAY APPARATUS

(75) Inventors: Hiroyuki Kobayashi, Kanagawa (JP); Naoya Matsuda, Tokyo (JP); Makoto Haitani, Kanagawa (JP); Kenichiro Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 957 days.

This patent is subject to a terminal disclaimer.

(21) Appl. No.: 12/098,084

(22) Filed: Apr. 4, 2008

(65) Prior Publication Data

US 2008/0246882 A1    Oct. 9, 2008

Related U.S. Application Data

(63) Continuation of application No. 10/381,347, filed as application No. PCT/JP02/07630 on Jul. 26, 2002, now Pat. No. 7,379,057.

(30) Foreign Application Priority Data

Jul. 27, 2001    (JP) .................................. 2001-227805
Jul. 27, 2001    (JP) .................................. 2001-227806

(51) Int. Cl.
*H04N 5/202*    (2006.01)

(52) U.S. Cl. ........ 348/674; 348/607; 345/600; 345/204; 345/601; 345/602

(58) Field of Classification Search .................. 348/607, 348/674; 345/600, 204, 601, 602
See application file for complete search history.

(56) References Cited

U.S. PATENT DOCUMENTS 6,344,857 B1 * 2/2002 Matono et al. ................ 345/600
7,379,057 B2 * 5/2008 Kobayashi et al. ........... 345/600

FOREIGN PATENT DOCUMENTS

| EP | 1 067 507 | 1/2001 |
| EP | 1 237 138 | 9/2002 |
| JP | 63-162248 | 7/1988 |
| JP | 5-173523 | 7/1993 |
| JP | 11-109927 | 4/1999 |
| JP | 2000-284773 | 10/2000 |
| JP | 2000-298450 | 10/2000 |
| JP | 2001-231053 | 8/2001 |
| WO | WO 01 22391 | 3/2001 |

* cited by examiner

*Primary Examiner* — Jefferey Harold
*Assistant Examiner* — Mustafizur Rahman
(74) *Attorney, Agent, or Firm* — Frommer Lawrence & Haug LLP; William S. Frommer; Thomas F. Presson

(57) ABSTRACT

A nonlinearly processed (gamma-corrected) video signal is subjected to three-dimensional signal level correction using three-dimensional correction values and corresponding to a position in a horizontal direction and a vertical direction of a pixel on a display screen of an image display unit and the signal level of the pixel data. Thereby, accurate gamma correction is made possible, and horizontal and vertical area information (grid block) can be disposed in an optimum positional relation according to resolution of the screen.

1 Claim, 23 Drawing Sheets

POSITION BLOCK A [i, j]

[POSITION WITHIN POSITION BLOCK]

[LEVEL WITHIN LEVEL BLOCK]

NONLINEAR PROCESSING DEVICE AND IMAGE DISPLAY APPARATUS

This is a continuation of U.S. application Ser. No. 10/381,347, filed Nov. 4, 2003 now U.S. Pat. No. 7,379,057 under 35 USC 371 from International Application PCT/JP02/07630 filed Jul. 26, 2002, with a claim of priority under 35 USC 119 to Japanese Applications 2001-227805 and 2001-227806, filed in Japan on Jul. 27, 2001, the entirety of all hereby incorporated by reference herein.

TECHNICAL FIELD

The present invention relates to a nonlinear processing device for subjecting a video signal to correction by nonlinear processing according to characteristics of a display device of an image display unit for image display based on the video signal, and an image display apparatus using the nonlinear processing device.

BACKGROUND ART

In supplying a video signal to for example an image display unit as a liquid crystal display panel unit or the like for image display, and obtaining an image based on the video signal, the correction of level of the video signal by nonlinear processing according to display characteristics of the image display unit is proposed. Such correction of the level (voltage level) of the video signal by nonlinear processing is generally referred to as "gamma correction."

When the image display unit is formed by a liquid crystal display panel unit for image display, for example, a liquid crystal panel included in the liquid crystal display panel unit displays an image on the basis of a video signal. The image display is in principle effected by change in light transmittance of the liquid crystal panel in response to change in the level of the video signal.

FIG. 2 shows input voltage-light transmittance characteristics indicating a relation between input voltage V and light transmittance T of an example of the liquid crystal panel included in the liquid crystal display panel unit for image display. As is clear at a glance, the input voltage-light transmittance characteristics are nonlinear characteristics. The video signal supplied to the liquid crystal display panel unit that makes image display on the liquid crystal panel having such display characteristics is required to be corrected for level to correct the nonlinear characteristics.

The level correction made on the video signal in conformity to the requirement is gamma correction. Hence, the gamma correction when the liquid crystal display panel unit for image display is used is nonlinear processing correction of the level of the video signal supplied to the liquid crystal display panel unit according to the display characteristics of the liquid crystal display panel unit, or the input voltage-light transmittance characteristics of the liquid crystal panel included in the liquid crystal display panel unit.

FIG. 1 shows an example of a conventional image display apparatus that performs gamma correction of level of a video signal.

In this case, analog/digital (A/D) conversion units 121R, 121G, and 121B digitize a red primary color video signal SR, a green primary color video signal SG, and a blue primary color video signal SB, which form a color video signal, into a digital red primary color signal DR, a digital green primary color signal DG, and a digital blue primary color signal DB, respectively.

The digital red primary color signal DR, the digital green primary color signal DG, and the digital blue primary color signal DB are supplied to a contrast and brightness adjusting unit 122 to be each adjusted in contrast and brightness. Then, a digital red primary color signal DRA, a digital green primary color signal DGA, and a digital blue primary color signal DBA that are adjusted and obtained from the contrast and brightness adjusting unit 122 are supplied to a white balance adjusting unit 123.

In the white balance adjusting unit 123, the digital red primary color signal DRA is adjusted in gain by a gain adjusting unit 124R, and adjusted in direct-current level by a direct-current level adjusting unit 125R, whereby an adjusted digital red primary color signal DRB is obtained from the direct-current level adjusting unit 125R.

The digital green primary color signal DGA is similarly processed by a gain adjusting unit 124G and a direct-current level adjusting unit 125G. Further, the digital blue primary color signal DBA is processed by a gain adjusting unit 124B and a direct-current level adjusting unit 125B.

The digital red primary color signal DRB, the digital green primary color signal DGB, and the digital blue primary color signal DBB thus obtained have relative direct-current levels therebetween set properly. The white balance adjustment is thus made.

The digital red primary color signal DRB, the digital green primary color signal DGB, and the digital blue primary color signal DBB obtained from the white balance adjusting unit 123 are supplied to a gamma correction unit 126.

In the gamma correction unit 126, the digital red primary color signal DRB is subjected to nonlinear level processing by a nonlinear processing unit 127R.

The digital green primary color signal DGB and the digital blue primary color signal DBB are similarly subjected to nonlinear processing by nonlinear processing units 127G and 127B.

The nonlinear processing unit 127R includes a correction signal data table representing nonlinear characteristics in opposite relation to the display characteristics of a liquid crystal display panel unit 118R to be described later, that is, the input voltage-light transmittance characteristics of a liquid crystal panel included in the liquid crystal display panel unit 118R. The nonlinear processing unit 127R sequentially compares the signal level of the digital red primary color signal DRB with the correction signal data table, and then reads corresponding correction signal data. The correction signal data is derived as a digital red primary color signal DRC having a signal level corrected. Thereby the digital red primary color signal DRC derived from the nonlinear processing unit 127R is corrected for signal level by nonlinear processing, that is, gamma-corrected to correct the input voltage-light transmittance characteristics as shown in FIG. 2, for example, of the liquid crystal panel included in the liquid crystal display panel unit 118R.

Similarly, the nonlinear processing unit 127G subjects the digital green primary color signal DGB to gamma correction processing corresponding to a liquid crystal panel included in a liquid crystal display panel unit 118G, and then outputs a digital green primary color signal DGC.

The nonlinear processing unit 127B also subjects the digital green primary color signal DBB to gamma correction processing corresponding to a liquid crystal panel included in a liquid crystal display panel unit 118B., and then outputs a digital green primary color signal DBC.

D/A conversion units 128R, 128G, and 128B convert the digital red primary color signal DRC, the digital green primary color signal DGC, and the digital blue primary color signal DBC that are gamma-corrected and outputted from the gamma correction unit 26 into a gamma-corrected analog red primary color video signal SRC', a gamma-corrected analog green primary color video signal SGC', and a gamma-corrected analog blue primary color video signal SBC'. The gamma-corrected analog red primary color video signal SRC', the gamma-corrected analog green primary color video signal SGC', and the gamma-corrected analog blue primary color video signal SBC' are supplied to display driving units 117R, 117G, and 117B, respectively.

Thereby a display driving signal SDR' based on the red primary color video signal SRC' is obtained from the display driving unit 117R, and supplied to the liquid crystal display panel unit 118R. Also, a display driving signal SDG' based on the green primary-color video signal SGC' is obtained from the display driving unit 117G, and supplied to the liquid crystal display panel unit 118G. Further, a display driving signal SDB' based on the blue primary color video signal SBC' is obtained from the display driving unit 117B, and supplied to the liquid crystal display panel unit 118B.

The image display apparatus of FIG. 1 further includes: a timing signal generating unit 119 for generating timing signals T1 to T6 on the basis of a horizontal synchronizing signal SH and a vertical synchronizing signal SV; and a PLL unit 120.

The timing signal generating unit 119 supplies the timing signals T1 to T6 to the display driving units 117R, 117G, and 117B and the liquid crystal display panel units 118R, 118G, and 118B, respectively, to operate these parts in predetermined timing.

Thereby the liquid crystal display panel unit 118R is driven by the display driving signal SDR' from the display driving unit 117R. A red primary color image corresponding to the gamma-corrected red primary color video signal SRC' is thus displayed on the liquid crystal display panel unit 118R.

Similarly, a green primary color image and a blue primary color image corresponding to the gamma-corrected green primary color video signal SGC' and the gamma-corrected blue primary color video signal SBC' are displayed on the liquid crystal display panel units 118G and 118B.

The red primary color image, the green primary color image, and the blue primary color image thus obtained on the liquid crystal display panel units 118R, 118G, and 118B, respectively, are projected in a state of being superimposed on each other on a projection screen via a projection optical system including a projection lens, for example, whereby a color image based on the color video signal formed by the red primary color video signal SR, the green primary color video signal SG, and the blue primary color video signal SB is obtained on the projection screen.

The conventional image display apparatus can make gamma correction, that is, in this case, correct the input voltage-light transmittance characteristics of the liquid crystal panels included in the liquid crystal display panel units 118R, 118G, and 118B. However, the gamma correction in this case is made commonly on pixel data of the digital video signal which pixel data corresponds to each of pixels distributed on the entire image screen obtained on the liquid crystal panel included in each of the liquid crystal display panel units 118R, 118G, and 118B.

That is, the gamma correction based on the same nonlinear characteristics is made on pixel data of the digital video signal which pixel data corresponds to a pixel at a central portion of the image screen obtained on the liquid crystal panel and pixel data of the digital video signal which pixel data corresponds to a pixel at a peripheral portion of the image screen, for example. Such gamma correction cannot correct for differences in the input voltage-light transmittance characteristics according to the position within the screen of the liquid crystal panel.

In addition, the gamma correction does not correct undesired variations in brightness and chromaticity of the red primary color image, the green primary color image, and the blue primary color image thus obtained on the liquid crystal display panel units 118R, 118G, and 118B, respectively, which variations are caused by variations in level of the input video signal, that is., the red primary color video signal SR, the green primary color video signal SG, and the blue primary color video signal SB.

Accordingly, the present applicant has previously proposed a nonlinear processing device and an image display apparatus that can correct the input voltage-light transmittance characteristics in a horizontal and a vertical direction of the screen, that is, according to a position on the screen, and which can further make correction according to signal level (Japanese Patent Application No. Hei 9-271598).

This means further correction of gamma-corrected pixel data according to the position in two-dimensional directions (the horizontal and vertical directions) on the screen and the level. That is, three-dimensional correction is added to gamma correction processing.

The correction in the horizontal and vertical directions is as follows.

FIG. 3 shows a grid block as horizontal and vertical area information for the correction in the horizontal and vertical directions.

The grid block is formed by setting a plurality of areas in a form of a grid in divided units of about 128 pixels, for example, in an X-direction (horizontal direction) and a Y-direction (vertical direction) on the screen. The grid block is formed by correction values C given at points of intersection of horizontal lines and vertical lines.

Suppose that coordinates 0 to p are given in the X-direction, and that coordinates 0 to q are given in the Y-direction, for example. The correction values shown as C(0, 0), C(0, 1), ... C(p, q) in FIG. 3 are set at coordinates of the points of intersection indicated by dots. Hence, (p+1)×(q+1) correction values are set.

Thereby, (p×q) areas enclosed by coordinates of four intersections (correction values) are formed. The areas are shown as [1, 1], [1, 2], ... [p, q].

In the correction in the horizontal and vertical directions added to the gamma correction, first an area in such a grid block to which area pixel data belongs is detected. After the area is determined, the position of the pixel data within the area is determined, and then a two-dimensional correction value is calculated from the four correction values forming the area. Thereafter, gamma-corrected pixel data is further corrected by the calculated two-dimensional correction value, whereby the correction according to the horizontal and vertical directions is made possible.

Taking pixel data dxy as an example, it is first determined that the pixel data dxy is included in the area [5, 3], and further where the pixel data dxy is situated within the area [5, 3] is determined.

Since the pixel data dxy is included in the area [5, 3], four correction values C(4, 2), C(5, 2), C(4, 3), and C(5, 3) on the periphery of the area [5, 3] are used to calculate a two-dimensional correction value on the basis of distances of the pixel data dxy within the area [5, 3] from intersection coordinates of the correction values.

Three-dimensional correction is a three-dimensional extension of such two-dimensional correction resulting from addition of signal level on a Z-axis to the two-dimensional correction.

FIG. 4 shows a three-dimensional structure obtained by stacking the grid block of FIG. 3 in the Z-axis direction.

A number of signal level boundaries 0, 1, ... r are set in the Z-axis direction. A two-dimensional grid block as shown in FIG. 3 is set at each of the level boundaries, whereby a three-dimensional formation of correction values is obtained.

That is, in this case, a correction value C is set at each point of intersection of three-dimensional coordinates, and C(0, 0, 0) ... C(p, q, r) are set as correction values C. Hence, $(p+1) \times (q+1) \times (r+1)$ correction values are set.

Further, level blocks L1, L2, ... Lr are formed between the level boundaries.

A block formed by each of the areas [1, 1] ... [p, q] as shown in FIG. 3 in the grid block penetrating through the level blocks in the Z-direction is referred to as a position block. FIG. 6 shows a position block A[i, j], which will be described later in detail.

In this case, in the three-dimensional correction in the horizontal and vertical directions and according to level added to the gamma correction, a level block and a position block including the pixel data are first determined.

After the level block and the position block are determined, the level of the pixel data within the level block and the position of the pixel data within the position block are determined, and then a three-dimensional correction value is calculated. In this case, pixel data is situated in a three-dimensional block where a position block and a level block intersect each other. The three-dimensional block is enclosed by eight correction values C. Thus, a three-dimensional correction value corresponding to the pixel data is calculated from the eight correction values according to the position and level of the pixel data within the three-dimensional block. Gamma-corrected pixel data is further corrected by the calculated three-dimensional correction value, whereby the correction in the horizontal and vertical directions and according to the signal level is made possible.

In obtaining a video signal nonlinearly corrected by such techniques previously proposed by the present applicant, the nonlinearly corrected video signal is corrected for undesired variations in brightness and chromaticity according to the horizontal and vertical position on the display screen, and further for undesired variations in brightness and chromaticity of the display screen obtained on the image display unit which variations are caused by variations in level of the original video signal.

However, when the video signal is to be linearly corrected with higher accuracy by applying the techniques previously proposed by the present applicant, there are problems as described in the following which are caused by difference in characteristics between various display devices for the image display unit.

(1) Generally, nonlinear characteristics of output level with respect to input vary with each display device.

There are various kinds of display devices such for example as LCD (Liquid Crystal Display), CRT (Cathode Ray Tube), PDP (Plasma Display Panel), PALC (Plasma Addressed Liquid Crystal), and DLP (Digital Light Processing). They have different nonlinear characteristics.

Also, even individual display devices of the same kind have varying nonlinear characteristics. When a plurality of liquid crystal panels are considered, for example; the plurality of liquid crystal panels have roughly the same nonlinear characteristics, but the nonlinear characteristics vary with each individual liquid crystal panel.

When three-dimensional correction as described above is made in such a situation, the level boundaries in the Z-axis direction are not necessarily set appropriately, so that favorable effects of the three-dimensional correction may not be obtained.

When a nonlinear processing device including the three-dimensional correction is applied to circuit systems of various display devices, for example, the nonlinear processing device cannot deal with difference in nonlinear characteristics of each display device. Even when the nonlinear processing device is included in display devices of the same kind, the nonlinear processing device cannot deal with difference in nonlinear characteristics of each individual display device.

As a result of the above, accuracy of three-dimensional correction for gamma correction can deteriorate.

(2) Image resolution generally varies with each display device.

It is desirable that an upper edge, a lower edge, a left edge, and a right edge of the grid block of correction values in the horizontal and vertical two-dimensional directions coincide with those of an image area.

That is, it is ideal if coordinates (0, 0), (p, 0), (0, q), and (p, q) of four corners of a grid block of FIG. 23, for example, represent four corners of an image area as they are.

When consideration is given to a case where a circuit for making the above-described nonlinear correction is included in image display apparatus as a signal processing system for various display devices, the display devices employed are of course expected to have various screen resolutions. Ideally, it is desirable that size of the grid block be changed according to the resolution to coincide with that of the image area.

However, this requires preparation of enormous amounts of correction values and coordinate values in correspondence with various grid block sizes, thus greatly increasing the scale of the circuit. Thus, the coordinates (and correction values) of the grid block are usually fixed so that display devices of various resolutions are dealt with by a single grid block.

This, however, results in a vertically and horizontally asymmetric relation between the grid block and the image area. Thus, correction of nonlinear characteristics in the two-dimensional directions may result in an unnatural image state.

When a nonlinear correction circuit in which a grid block provided for a device with a high resolution is set is incorporated in a signal processing system for a display device with a low resolution, for example, a relation between the grid block and the image area is as shown in FIG. 19A.

That is, since the grid block and the image area are made to correspond to each other by using coordinates (0, 0) as an origin, amounts of displacement between the grid block and the image area are asymmetric in both the horizontal direction and the vertical direction. This results in an unnatural image.

DISCLOSURE OF INVENTION

In view of the above, it is an object of the present invention to provide a nonlinear processing device that can deal with difference in nonlinear characteristics according to the type of display device or the individual display device. It is another object of the present invention to enable such a nonlinear processing device to be realized by a circuit configuration on a relatively small scale. It is another object of the present invention to provide an image display apparatus including such a nonlinear processing device.

In view of the above, it is a further object of the present invention to eliminate unnaturalness of an image as a result of correction in a nonlinear processing device, which performs correction in a horizontal and a vertical direction of a result of nonlinear correction processing using a fixed grid block, even when resolution of a display device does not match the grid block. It is a further object of the present invention to provide an image display apparatus including such a nonlinear processing device.

According to the present invention, there is provided a nonlinear processing device including nonlinear processing means for correcting a video signal for signal level by nonlinear processing according to display characteristics of an image display unit for making image display based on the video signal, horizontal and vertical position determining means for determining a position in a horizontal direction and a vertical direction of a pixel in the video signal, level determining means for determining signal level of the pixel in the video signal, level boundary setting means for variably setting a level boundary value used in determination by the level determining means, three-dimensional correction means for generating a three-dimensional signal level correction value according to the position in the horizontal direction and the vertical direction determined by the horizontal and vertical position determining means and the signal level determined by the level determining means, and thereby making three-dimensional correction of the video signal, and combining means for combining the video signal corrected by the nonlinear processing means with the video signal corrected by the three-dimensional correction means for output.

According to the present invention, there is provided an image display apparatus including nonlinear processing means for correcting a video signal for signal level by nonlinear processing according to display characteristics of an image display unit for making image display based on the video signal, horizontal and vertical position determining means for determining a position in a horizontal direction and a vertical direction of a pixel in the video signal, level determining means for determining signal level of the pixel in the video signal, level boundary setting means for variably setting a level boundary value used in determination by the level determining means, three-dimensional correction means for generating a three-dimensional signal level correction value according to the position in the horizontal direction and the vertical direction determined by the horizontal and vertical position determining means and the signal level determined by the level determining means, and thereby making three-dimensional correction of the video signal, combining means for combining the video signal corrected by the nonlinear processing means with the video signal corrected by the three-dimensional correction means for output, and image display means having the image display unit for making image display based on a video signal outputted from the combining means.

In the nonlinear processing device or the image display apparatus, the level boundary setting means has a register for storing a level boundary value, and by rewriting the level boundary value of the register, the level boundary value used for determination by the level determining means is variably set.

Alternatively, the level boundary setting means stores various level boundary values, and by supplying the level determining means with a level boundary value selected from the stored level boundary values, the level boundary value used for determination by the level determining means is set.

The nonlinear processing device or the image display apparatus further includes boundary value offsetting means for supplying an offset value to the level determining means and thereby offsetting the level boundary value set to be used for determination by the level determining means.

Thus, according to the present invention, the video signal nonlinearly processed (gamma-corrected) by the nonlinear processing means is subjected to three-dimensional signal level correction using the three-dimensional correction value and corresponding to the position in the horizontal direction and the vertical direction of the pixel on a display screen of the image display unit and the signal level of the pixel data.

Since the level boundary value for the signal level in the three-dimensional correction can be variably set, it is possible to make optimum three-dimensional correction of nonlinear characteristics of various types of display devices and each individual display device.

Further, according to the present invention, there is provided a nonlinear processing device including nonlinear processing means for correcting a video signal for signal level by nonlinear processing according to display characteristics of an image display unit for making image display based on the video signal, horizontal and vertical position determining means for determining a position in a horizontal direction and a vertical direction of a pixel in the video signal, horizontal and vertical relative position changing means for changing a relative position relation between horizontal and vertical area information used for determination by the horizontal and vertical position determining means and an image area of the video signal for the determination by the horizontal and vertical position determining means, level determining means for determining signal level of the pixel in the video signal, three-dimensional correction means for generating a three-dimensional signal level correction value according to the position in the horizontal direction and the vertical direction determined by the horizontal and vertical position determining means and the signal level determined by the level determining means, and thereby making three-dimensional correction of the video signal, and combining means for combining the video signal corrected by the nonlinear processing means with the video signal corrected by the three-dimensional correction means for output.

Further, according to the present invention, there is provided an image display apparatus including nonlinear processing means for correcting a video signal for signal level by nonlinear processing according to display characteristics of an image display unit for making image display based on the video signal, horizontal and vertical position determining means for determining a position in a horizontal direction and a vertical direction of a pixel in the video signal, horizontal and vertical relative position changing means for changing a relative position relation between horizontal and vertical area information used for determination by the horizontal and vertical position determining means and an image area of the video signal for the determination by the horizontal and vertical position determining means, level determining means for determining signal level of the pixel in the video signal, three-dimensional correction means for generating a three-dimensional signal level correction value according to the position in the horizontal direction and the vertical direction determined by the horizontal and vertical position determining means and the signal level determined by the level determining means, and thereby making three-dimensional correction of the video signal, combining means for combining the video signal corrected by the nonlinear processing means with the video signal corrected by the three-dimensional correction means for output, and image display means having the image display unit for making image display based on a video signal outputted from the combining means.

In the nonlinear processing device or the image display apparatus, the horizontal and vertical relative position changing means changes the relative position relation by giving an offset value in the horizontal direction and an offset value in the vertical direction to the horizontal and vertical position determining means.

Further, the horizontal and vertical relative position changing means changes the relative position relation such that an amount of displacement between the horizontal and vertical area information and the image area is averaged in the vertical direction or the horizontal direction.

Thus, according to the present invention, the video signal nonlinearly processed (gamma-corrected) by the nonlinear processing means is subjected to three-dimensional signal level correction using the three-dimensional correction value and corresponding to the position in the horizontal direction and the vertical direction of the pixel on a display screen of the image display unit and the signal level of the pixel data.

Since the positional relation between the horizontal and vertical area information (grid block) of two-dimensional correction values in the horizontal and vertical directions in the three-dimensional correction and the image area can be variably set, it is possible to deal with resolutions of various kinds of display devices and eliminate unnaturalness of a result of the correction.

BEST MODE FOR CARRYING OUT THE INVENTION

Figure 1:
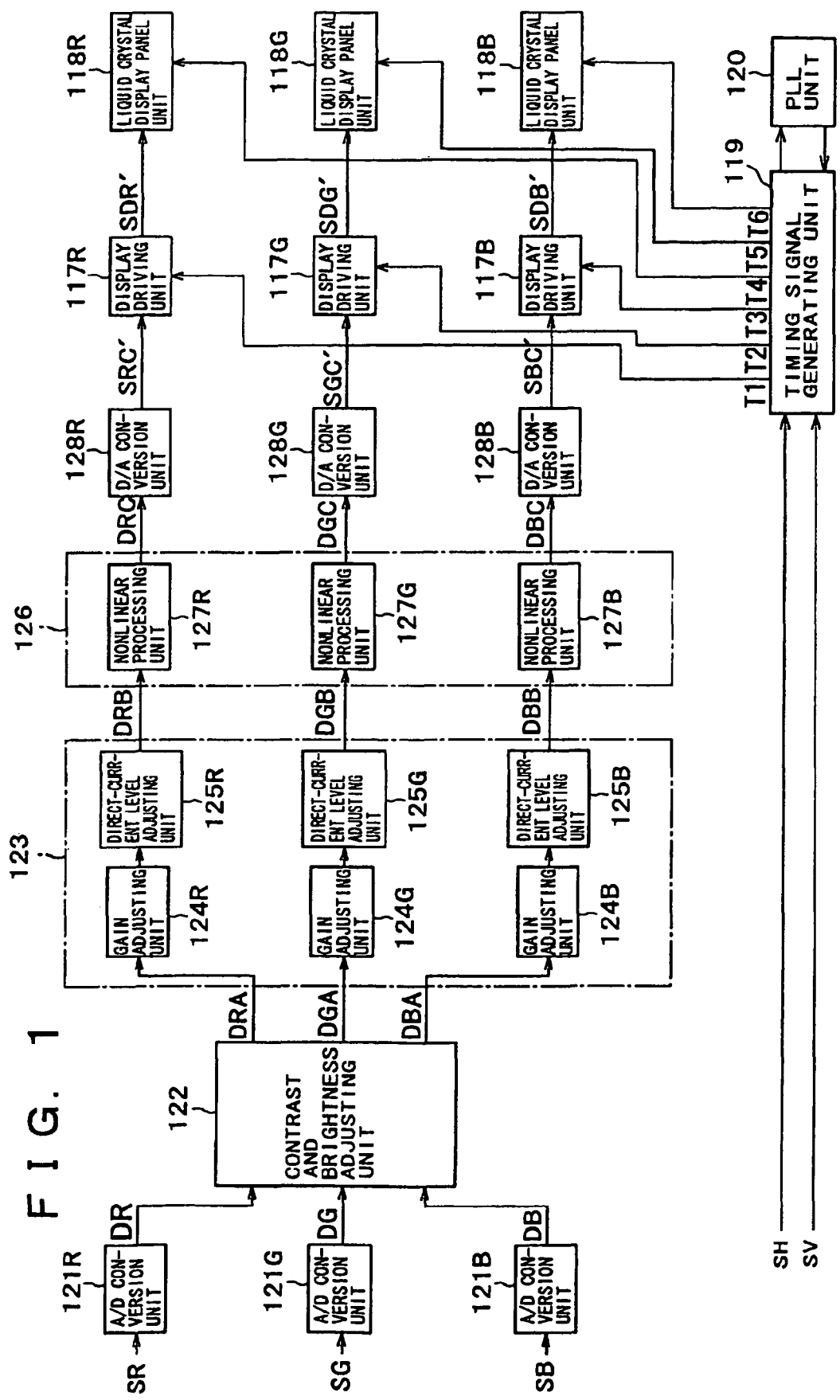
FIG. 1 is a block diagram of a conventional image display apparatus.

A preferred embodiment of the present invention will hereinafter be described in the following order.
1. Configuration of image display apparatus
2. Position blocks and level blocks
3. First example of configuration of nonlinear correction unit
4. Second example of configuration of nonlinear correction unit
5. Third example of configuration of nonlinear correction unit
6. Fourth example of configuration of nonlinear correction unit
7. Fifth example of configuration of nonlinear correction unit
8. Sixth example of configuration of nonlinear correction unit 1. Configuration of Image Display Apparatus An example of configuration of an image display apparatus according to the embodiment will first be described with reference to FIG. 5.

The image display apparatus is an example of configuration of an image display apparatus that employs a liquid crystal display panel as a display device, and digitizes a video signal and then performs signal processing such as white balance and nonlinear processing.

The image display apparatus is characterized especially by the configuration of a nonlinear correction unit 16. The configuration of the nonlinear correction unit 16 will be described later in detail as a first to a sixth configuration example.

Various configurations are conceivable for a signal processing system in stages preceding the nonlinear correction unit 16, a signal processing system in stages succeeding the nonlinear correction unit 16, a kind of display device employed, and the like in the image display apparatus according to the present invention. Therefore, the image display apparatus according to the present invention is not limited to the example of configuration of the image display apparatus to be described below.

Figure 5:
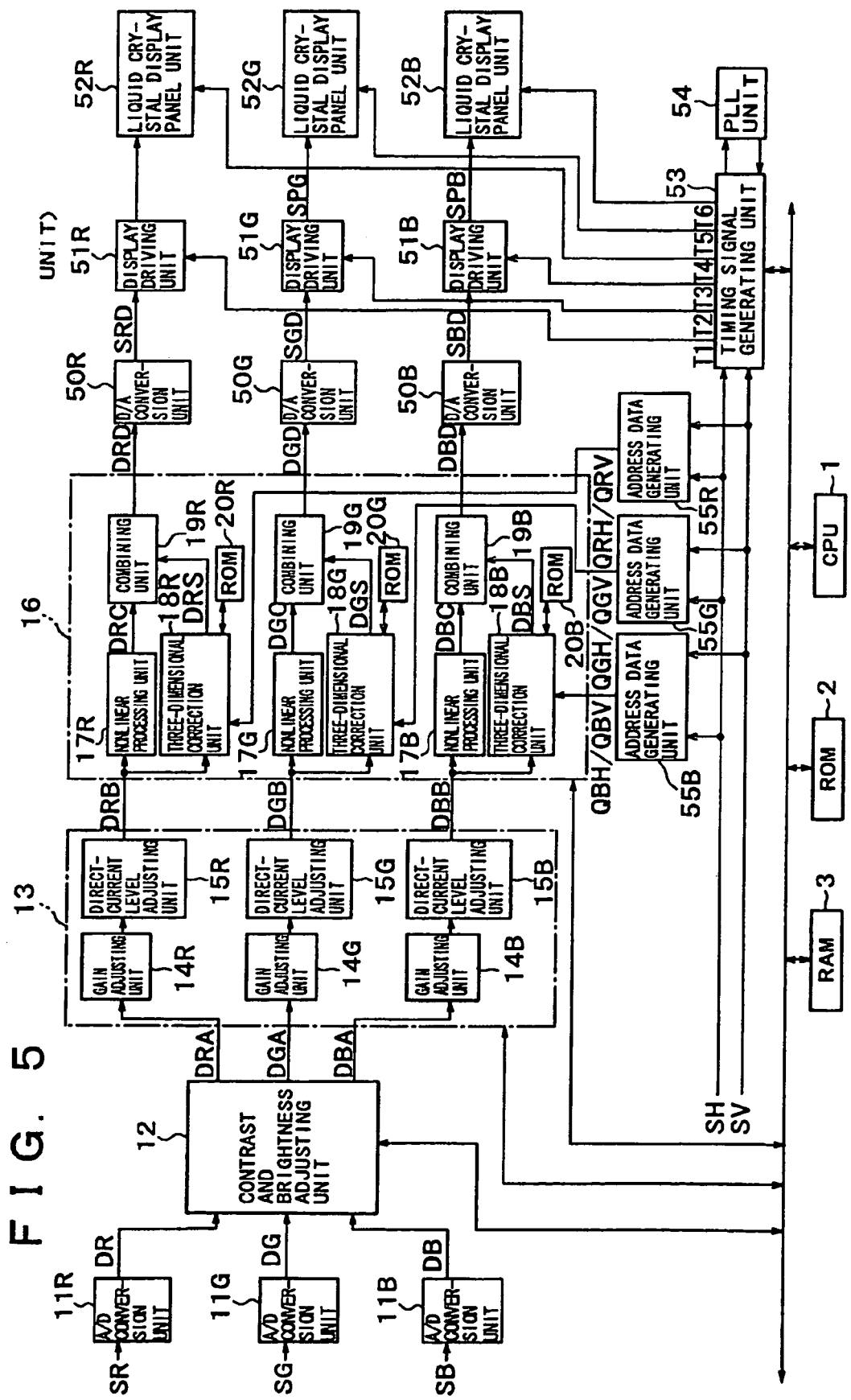
FIG. 5 is a block diagram of an image display apparatus according to an embodiment of the present invention.

In the example shown in FIG. 5, A/D conversion units 11R, 11G, and 11B digitize a red primary color video signal SR, a green primary color video signal SG, and a blue primary color video signal SB, which form a color video signal, into a digital red primary color signal DR, a digital green primary color signal DG, and a digital blue primary color signal DB, respectively.

The digital red primary color signal DR, the digital green primary color signal DG, and the digital blue primary color signal DB are supplied to a contrast and brightness adjusting unit 12 to be each adjusted in contrast and brightness. Then, a digital red primary color signal DRA, a digital green primary color signal DGA, and a digital blue primary color signal DBA that are adjusted and obtained from the contrast and brightness adjusting unit 12 are supplied to a white balance adjusting unit 13.

In the white balance adjusting unit 13, the digital red primary color signal DRA is adjusted in gain by a gain adjusting unit 14R, and adjusted in direct-current level by a direct-current level adjusting unit 15R, whereby an adjusted digital red primary color signal DRB is obtained.

Similarly, the digital green primary color signal DGA is adjusted in gain by a gain adjusting unit 14G, and adjusted in direct-current level by a direct-current level adjusting unit 15G, whereby an adjusted digital green primary color signal DGB is obtained.

Further, similarly, the digital blue primary color signal DBA is adjusted in gain by a gain adjusting unit 14B, and adjusted in direct-current level by a direct-current level adjusting unit 15B, whereby an adjusted digital blue primary color signal DBB is obtained.

The digital red primary color signal DRB, the digital green primary color signal DGB, and the digital blue primary color signal DBB thus obtained have relative direct-current levels therebetween set properly. The white balance adjustment is thus made.

The digital red primary color signal DRB, the digital green primary color signal DGB, and the digital blue primary color signal DBB obtained from the white balance adjusting unit 13 are supplied to the nonlinear correction unit 16.

In the nonlinear correction unit 16, the digital red primary color signal DRB is supplied to a nonlinear processing unit 17R and a three-dimensional correction unit 18R; the digital green primary color signal DGB is supplied to a nonlinear processing unit 17G and a three-dimensional correction unit 18R; and the digital blue primary color signal DBB is supplied to a nonlinear processing unit 17B and a three-dimensional correction unit 18B.

Further, the configuration example shown in FIG. 5 is provided with a timing signal generating unit 53 and address data generating units 55R, 55G, and 55B, which are supplied with a horizontal synchronizing signal SH and a vertical synchronizing signal SV in the color video signal formed by the red primary color video signal SR, the green primary color video signal SG, and the blue primary color video signal SB.

The timing signal generating unit 53 is connected with a PLL unit 54.

The red primary color video signal SR, the green primary color video signal SG, and the blue primary color video signal SB are each in synchronism with the horizontal synchronizing signal SH and the vertical synchronizing signal SV supplied to each of the timing signal generating unit 53 and the address data generating units 55R, 55G, and 55B.

The timing signal generating unit 53 generates timing signals T1 to T6 on the basis of the horizontal synchronizing signal SH and the vertical synchronizing signal SV.

In response to the horizontal synchronizing signal SH and the vertical synchronizing signal SV, the address data generating unit 55R generates horizontal address data QRH and vertical address data QRV corresponding to each pixel of an image screen obtained on a liquid crystal panel included in a liquid crystal display panel unit 52R to be described later. The address data generating unit 55R supplies the horizontal address data QRH and the vertical address data QRV to the three-dimensional correction unit 18R in the digital nonlinear correction unit 16.

In response to the horizontal synchronizing signal SH and the vertical synchronizing signal SV, the address data generating unit 55G generates horizontal address data QGH and vertical address data QGV corresponding to each pixel of an image screen obtained on a liquid crystal panel within a liquid crystal display panel unit 52G. The address data generating unit 55G supplies the horizontal address data QGH and the vertical address data QGV to the three-dimensional correction unit 18G.

In response to the horizontal synchronizing signal SH and the vertical synchronizing signal SV, the address data generating unit 55B generates horizontal address data QBH and vertical address data QBV corresponding to each pixel of an image screen obtained on a liquid crystal panel within a liquid crystal display-panel unit 52B. The address data generating unit 55B supplies the horizontal address data QBH and the vertical address data QBV to the three-dimensional correction unit 18B.

The nonlinear correction unit 16 has the nonlinear processing unit 17R, the three-dimensional correction unit 18R, a combining unit 19R, and a ROM 20R as parts corresponding to the digital red primary color signal DRB inputted to the nonlinear correction unit 16.

Further, the nonlinear correction unit 16 has the nonlinear processing unit 17G, the three-dimensional correction unit 18G, a combining unit 19G, and a ROM 20G as parts corresponding to the digital green primary color signal DGB.

Further, the nonlinear correction unit 16 has the nonlinear processing unit 17B, the three-dimensional correction unit 18B, a combining unit 19B, and a ROM 20B as parts corresponding to the digital blue primary color signal DBB.

The nonlinear processing unit 17R, the three-dimensional correction unit 18R, the combining unit 19R, and the ROM 20R corresponding to the digital red primary color signal DRB will be described.

The nonlinear processing unit 17R stores gamma correction data representing nonlinear characteristics in opposite relation to the display characteristics of the liquid crystal display panel unit 52R, that is, the input voltage-light transmittance characteristics of the liquid crystal panel included in the liquid crystal display panel unit 52R. The nonlinear processing unit 17R reads gamma correction data corresponding to a signal level of the digital red primary color signal DRB obtained from the white balance adjusting unit 13. The gamma correction data is derived as a digital red primary color signal DRC having a signal level resulting from nonlinear processing (gamma correction).

Figure 2:
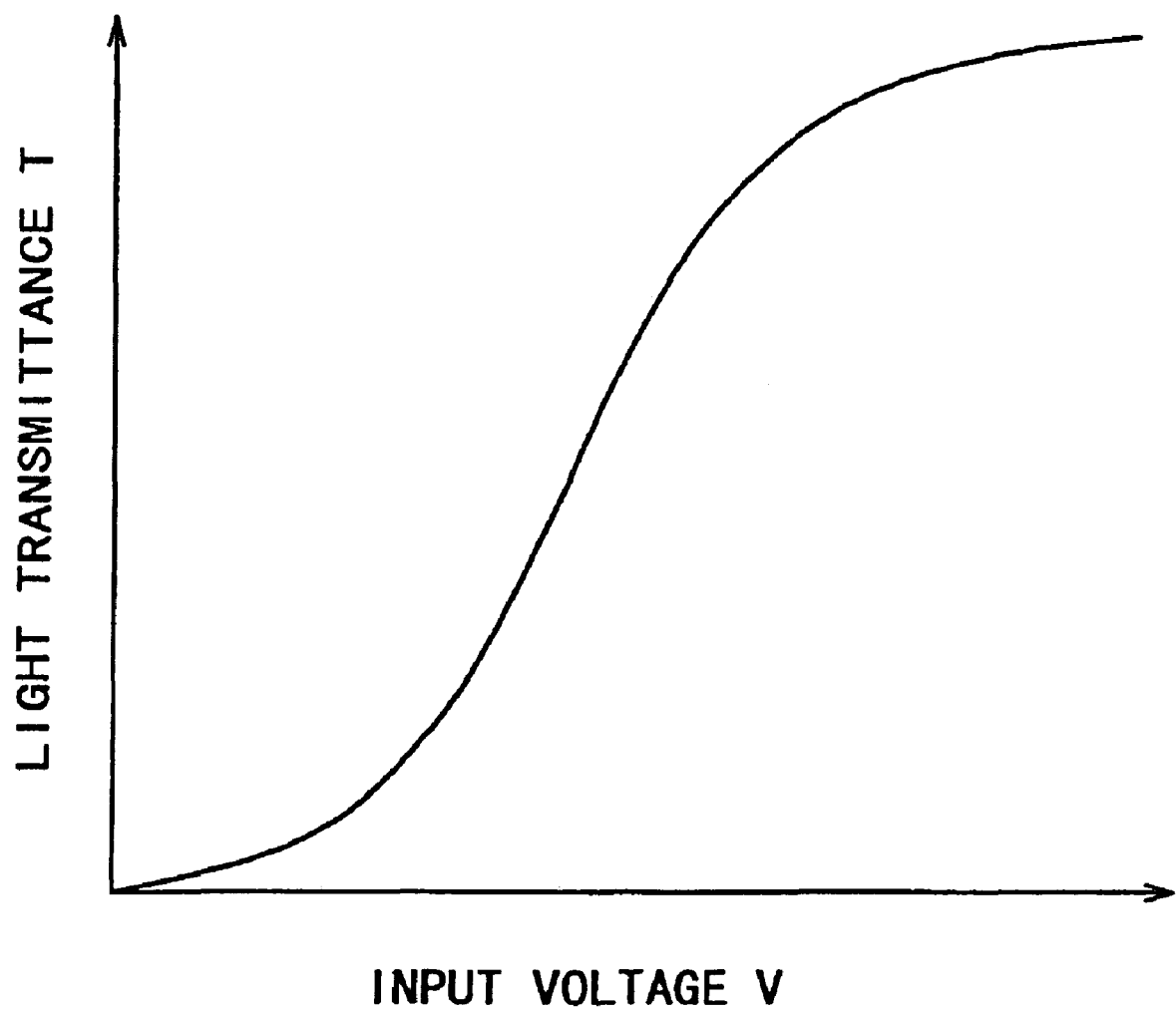
FIG. 2 is a diagram of assistance in explaining input voltage-light transmittance characteristics of a liquid crystal panel.

Thereby the digital red primary color signal DRC derived from the nonlinear processing unit 17R is gamma-corrected to correct the input voltage-light transmittance characteristics shown in FIG. 2, for example, of the liquid crystal panel included in the liquid crystal display panel unit 52R. The digital red primary color signal DRC is supplied to the combining unit 19R.

In the meantime, according to the horizontal address data QRH and the vertical address data QRV from the address data generating unit 55R, the three-dimensional correction unit 18R subjects a signal level of each piece of pixel data in the digital red primary color signal DRB obtained from the white balance adjusting unit 13 to three-dimensional correction corresponding to a position in a horizontal direction and a vertical direction of a pixel of an image screen obtained on the liquid crystal panel included in the liquid crystal display panel unit 52R, which pixel corresponds to the pixel data, and the signal level of the pixel data in the digital red primary color signal DRB.

Each correction value C in a three-dimensional coordinate space in a horizontal direction, a vertical direction, and a level direction for the three-dimensional correction is stored in a ROM 20R. The three-dimensional correction unit 18R loads the correction value C of the ROM 20R for use in calculation.

Then, a three-dimensionally corrected digital red primary color signal DRS formed by each piece of pixel data whose signal level is three-dimensionally corrected is supplied from the three-dimensional correction unit 18R to the combining unit 19R.

The combining unit 19R combines the digital red primary color signal DRC whose signal level is corrected by nonlinear processing, the digital red primary color signal DRC being obtained from the nonlinear processing unit 17R, with the three-dimensionally corrected digital red primary color signal DRS whose signal level is three-dimensionally corrected, the three-dimensionally corrected digital red primary color signal DRS being obtained from the three-dimensional correction unit 18R. Thereby a digital red primary color signal DRD that is gamma-corrected and further three-dimensionally corrected is outputted from the combining unit 19R.

The nonlinear processing unit 17G, the three-dimensional correction unit 18G, the combining unit 19G, the ROM 20G, and the address data generating unit 55G corresponding to the digital green primary color signal DGB each function in the same manner as described above.

Specifically, the nonlinear processing unit 47G makes gamma correction for the input voltage-light transmittance characteristics of the liquid crystal panel included in the liquid crystal display panel unit 52G. A gamma-corrected digital green primary color signal DGC is derived and supplied to the combining unit 49G.

Using the horizontal address data QGH and the vertical address data QGV from the address data generating unit 55G, the three-dimensional correction unit 18G subjects the digital green primary color signal DGB to three-dimensional correction corresponding to a position in a horizontal direction and a vertical direction of pixel data and a signal level of the pixel data in the digital green primary color signal DGB. Then, a three-dimensionally corrected digital green primary color signal DGS is supplied to the combining unit 49G.

The combining unit 49G combines the digital green primary color signal DGC obtained from the nonlinear processing unit 47G with the three-dimensionally corrected digital green primary color signal DGS obtained from the three-dimensional correction unit 48G, and then outputs the result. Thereby a digital green primary color signal DGD that is gamma-corrected and further three-dimensionally corrected is outputted.

The nonlinear processing unit 17B, the three-dimensional correction unit 18B, the combining unit 19B, the ROM 20B, and the address data generating unit 55B corresponding to the digital blue primary color signal DBB each function in the same manner as described above.

Specifically, the nonlinear processing unit 47B makes gamma correction for the input voltage-light transmittance characteristics of the liquid crystal panel included in the liquid crystal display panel unit 52B. A gamma-corrected digital blue primary color signal DBC is derived and supplied to the combining unit 49B.

Using the horizontal address data QBH and the vertical address data QBV from the address data generating unit 55B, the three-dimensional correction unit 18B subjects the digital green primary color signal DBB to three-dimensional correction corresponding to a position in a horizontal direction and a vertical direction of pixel data and a signal level of the pixel data in the digital blue primary color signal DBB. Then, a three-dimensionally corrected digital blue primary color signal DBS is supplied to the combining unit 49B.

The combining unit 49B combines the digital blue primary color signal DBC obtained from the nonlinear processing unit 47B with the three-dimensionally corrected digital blue primary color signal DBS obtained from the three-dimensional correction unit 48B, and then outputs the result. Thereby a digital blue primary color signal DBD that is gamma-corrected and further three-dimensionally corrected is outputted.

Then, a D/A conversion unit 50R converts the nonlinearly corrected digital red primary color signal DRD obtained from the digital nonlinear correction unit 16 into a nonlinearly corrected analog red primary color video signal SRD. The nonlinearly corrected analog red primary color video signal SRD is supplied to a display driving unit 51R.

Similarly, a D/A conversion unit 50G converts the nonlinearly corrected digital green primary color signal DGD into a nonlinearly corrected analog green primary color video signal SGD. The nonlinearly corrected analog green primary color video signal SGD is supplied to a display driving unit 51G.

Further, a D/A conversion unit 50B converts the nonlinearly corrected digital blue primary color signal DBD into a nonlinearly corrected analog blue primary color video signal SBD. The nonlinearly corrected analog blue primary color video signal SBD is supplied to a display driving unit 51B.

The display driving unit 51R is connected to the liquid crystal display panel unit 52R. The display driving unit 51R and the liquid crystal display panel unit 52R are supplied with the timing signals T1 and T4, respectively, from the timing signal generating unit 53. In response to the timing signals T1 and T4, the display driving unit 51R and the liquid crystal display panel unit 52R operate in preset timing.

Thereby a display driving signal SPR based on the red primary color video signal SRD is obtained from the display driving unit 51R, and supplied to the liquid crystal display panel unit 52R. A red primary color image corresponding to the nonlinearly corrected red primary color video signal SRD obtained from the D/A conversion unit 50R is displayed on the liquid crystal panel included in the liquid crystal display panel unit 52R.

Also, the display driving unit 51G is connected to the liquid crystal display panel unit 52G. The display driving unit 51G and the liquid crystal display panel unit 52G are supplied with the timing signals T2 and T5, respectively, from the timing signal generating unit 53. In response to the timing signals T2 and T5, the display driving unit 51G and the liquid crystal display panel unit 52 G operate in preset timing.

Thereby a display driving signal SPG based on the green primary color video signal SGD is obtained from the display driving unit 51G, and supplied to the liquid crystal display panel unit 52G. A green primary color image corresponding to the nonlinearly corrected green primary color video signal SGD obtained from the D/A conversion unit 50G is displayed on the liquid crystal panel included in the liquid crystal display panel unit 52G.

Further, the display driving unit 51B is connected to the liquid crystal display panel unit 52B. The display driving unit 51B and the liquid crystal display panel unit 52B are supplied with the timing signals T3 and T6, respectively, from the timing signal generating unit 53. In response to the timing signals T3 and T6, the display driving unit 51B and the liquid crystal display panel unit 52B operate in preset timing.

Thereby a display driving signal SPB based on the blue primary color video signal SBD is obtained from the display driving unit 51B, and supplied to the liquid crystal display panel unit 52B. A blue primary color image corresponding to the nonlinearly corrected blue primary color video signal SBD obtained from the D/A conversion unit 50B is displayed on the liquid crystal panel included in the liquid crystal display panel unit 52B.

The red primary color image, the green primary color image, and the blue primary color image thus obtained in the liquid crystal display panel units 52R, 52G, and 52B, respectively, are projected in a state of being superimposed on each other on a projection screen via a projection optical system including a projection lens, for example, whereby a color image based on the color video signal formed by the red primary color video signal SR, the green primary color video signal SG, and the blue primary color video signal SB is obtained on the projection screen.

The red primary color image, the green primary color image, and the blue primary color image obtained in the liquid crystal display panel units 52R, 52G, and 52B, respectively, are based on the digital red primary color signal DRD, the digital green primary color signal DGD, and the digital blue primary color signal DBD, respectively, which are nonlinearly corrected and obtained from the nonlinear correction unit 16. The nonlinear correction in this example includes the gamma correction made to correct the input voltage-light transmittance characteristics shown in FIG. 2, for example, of the liquid crystal panels included in the liquid crystal display panel units 52R, 52G, and 52B, and the three-dimensional correction made for the signal level of each piece of pixel data in the digital red primary color signal DRB, the digital green primary color signal DGB, and the digital blue primary color signal DBB, the three-dimensional correction corresponding to the position in the horizontal direction and the vertical direction and the signal level of the pixel data. Thereby not only undesired variations on the display screen due to difference in display characteristics according to the position on the image screen of the liquid crystal panel included in the liquid crystal display panel unit 52R, 52G, or 52B, but also undesired variations in brightness and chromaticity of the display screen caused by variations in level of the original analog video signal, that is, the red primary color video signal SR, the green primary color video signal SG, or the blue primary color video signal SB are properly corrected.

A CPU 1, a ROM 2, and a RAM 3 are shown in FIG. 5. The CPU 1 functions as a unit for controlling the operation of the image display apparatus. The ROM 2 stores an operating program of the CPU 1, various control constants and the like. The RAM 3 is used to store various control coefficients and used as a work area for calculation and the like.

The operation of the contrast and brightness adjusting unit 12, the white balance adjusting unit 13, the nonlinear correction unit 16, the timing signal generating unit 53, and the like in particular in the circuit system shown in FIG. 5 is controlled.

For example, processing such as setting of adjustment coefficients in the contrast and brightness adjusting unit 12 and the white balance adjusting unit 13 and setting of register coefficients in the three-dimensional correction units 18R, 18G, and 18B of the nonlinear correction unit 16 or supplying selection control signals to the three-dimensional correction units 18R, 18G, and 18B is performed. The control of the three-dimensional correction units 18R, 18G, and 18B will be mentioned in the first to sixth configuration examples to be described later.

As described above, it is to be noted that the image display apparatus according to the present invention is characterized by the nonlinear correction unit 16, and that the other signal processing systems, the kind of display device employed and the like in the image display apparatus according to the present invention are not limited to the example of FIG. 5.

As a signal processing circuit, a configuration is conceivable in which a frame memory, a pixel count conversion processing unit and the like are provided between the A/D conversion units 11R, 11G, and 11B and the contrast and brightness adjusting unit 12, for example.

Further, as a display device, all kinds of display devices are conceivable, such for example as CRT (Cathode Ray Tube), PDP (Plasma Display Panel), PALC (Plasma Addressed Liquid Crystal), and DLP (Digital Light Processing). The signal processing systems are of course changed where necessary according to a display device employed.

2. Position Blocks and Level Blocks

The gamma correction and the three-dimensional correction will be described later in the first to sixth examples of configuration of the nonlinear correction unit 16. In the following, however, the concept of position blocks and level blocks used in the three-dimensional correction will first be described.

As described with reference to FIG. 3 and FIG. 4, for three-dimensional correction, a correction value is set at coordinates of each point of intersection of three-dimensional coordinates based on an X-axis, a Y-axis, and a Z-axis in a horizontal, a vertical, and a level direction.

Specifically, regarding a horizontal and a vertical direction of a screen, a plurality of areas in a form of a grid are set as a two-dimensional grid block in divided units of about 128 pixels, for example, in an X-direction (horizontal direction) and a Y-direction (vertical direction) on the screen. Coordinates 0 to p are given in the X-direction, and coordinates 0 to q are given in the Y-direction, for example.

Further, a number of signal level boundaries 0, 1, . . . r are set in a Z-axis direction. A two-dimensional grid block is set at each level boundary, whereby a three-dimensional formation of correction values is obtained.

That is, a correction value C is set at each point of intersection of three-dimensional coordinates, and C(0, 0, 0) . . . C(p, q, r) are set as correction values C. Hence, (p+1)×(q+1)× (r+1) correction values are set.

Further, level blocks L1, L2, . . . Lr are formed between the level boundaries.

Figure 3:
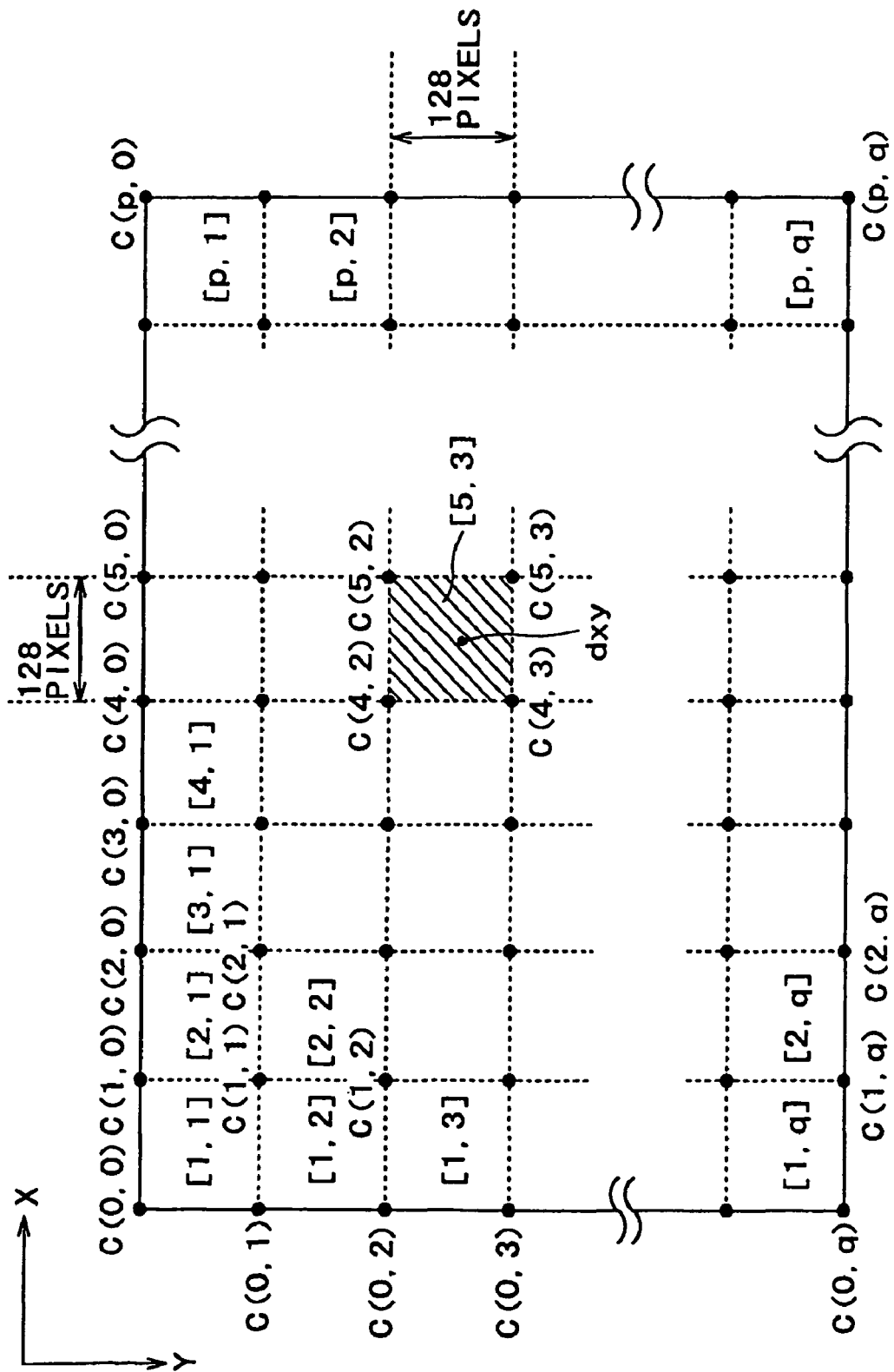
FIG. 3 is a diagram of assistance in explaining two-dimensional correction of gamma characteristics.
Figure 4:
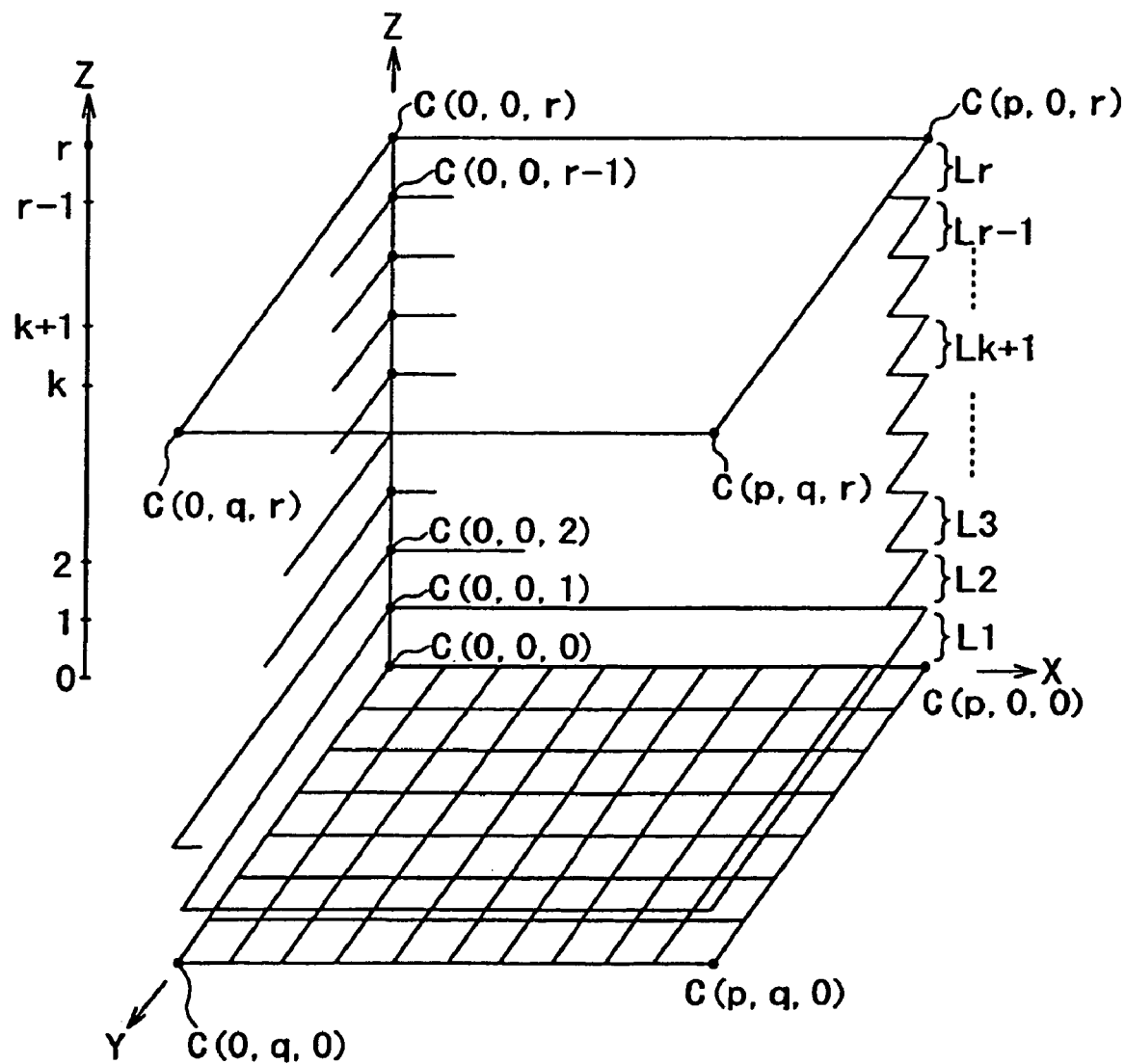
FIG. 4 is a diagram of assistance in explaining three-dimensional correction of gamma characteristics.

A block formed by each of areas [1, 1] . . . [p, q] as shown in FIG. 3 in the grid block penetrating through the level blocks in the Z-direction is referred to as a position block.

Figure 6:
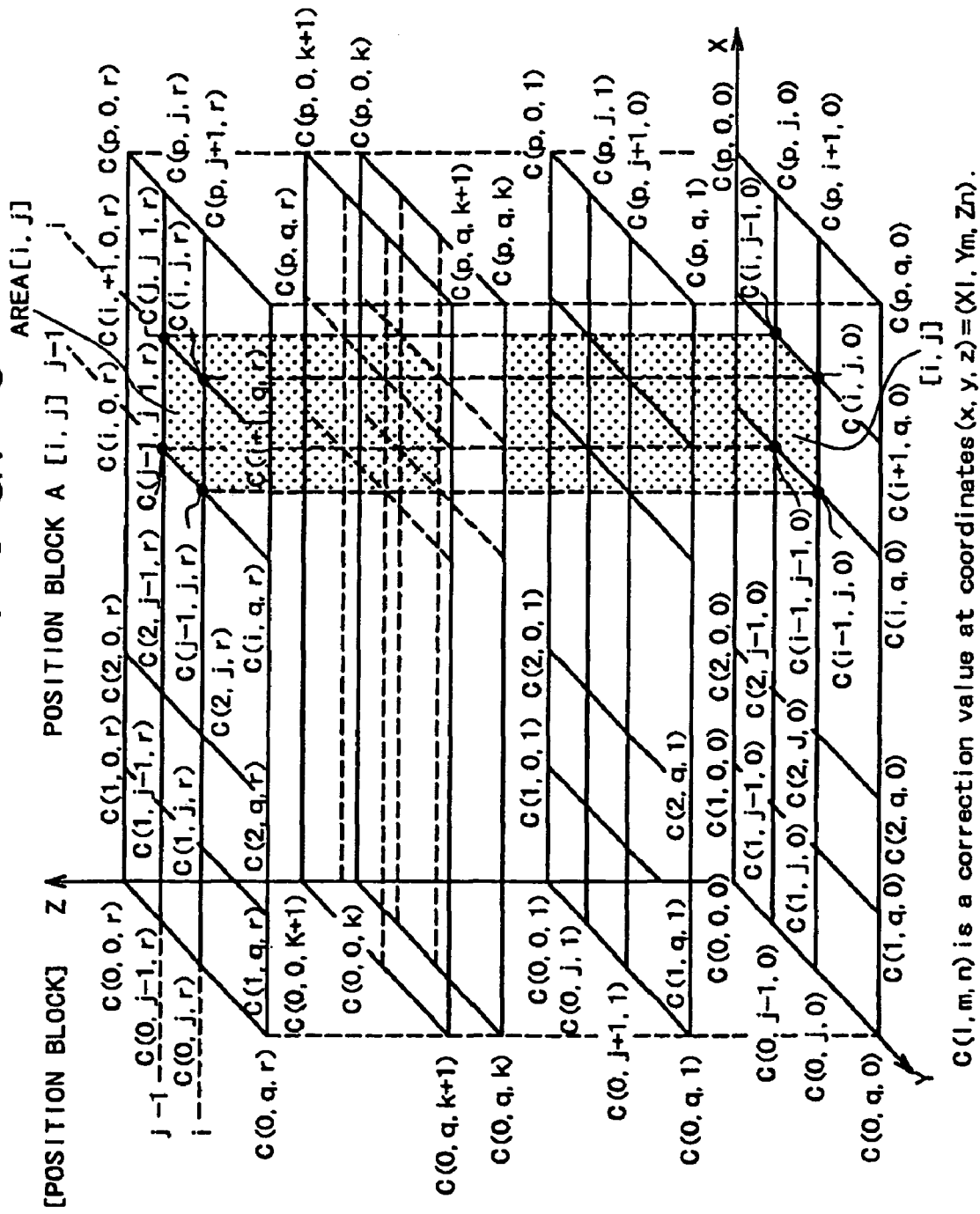
FIG. 6 is a diagram of assistance in explaining a position block according to the embodiment.

FIG. 6 shows a three-dimensional space in which C(0, 0, 0) . . . C(p, q, r) are set as correction values C. That is, the three-dimensional space is a three-dimensional structure in which a grid block formed with X coordinates 0, 1, . . . i−1, i, . . . p and Y coordinates 0, 1, . . . j−1, j, . . . q is formed at each level boundary 0, 1, . . . k, k+1, . . . r in the level direction.

Considering an area indicated by X coordinate values i−1 and i and Y coordinate values j−1 and j, a position block A[i, j] is a block penetrating from an area [i, j] at a level 0 to an area. [i, j] at a level r, as shown in FIG. 6.

That is, the position block A[i,] includes C(i−1, j−0) C(i, 1, 0), C(i−1, j, 0), C(i, j, ), . . . C(i−1, j−1, r), C(i, j−1, r), C(i−1, j, r), and C(i, j, r) as correction values C. This is a block for determining an area (position on the screen) in a two-dimensional grid block regardless of the level (Z coordinate).

Hence, a position block can basically be specified by correction values C(i−1, j−1), C(i, j−1), C(i−1, j), and C(i, j) at points of intersection of two-dimensional coordinates.

Level blocks L1, L2, . . . Lr are shown in FIG. 4. A level block L refers to a space sandwiched between grid blocks at two level boundary values.

Figure 7:
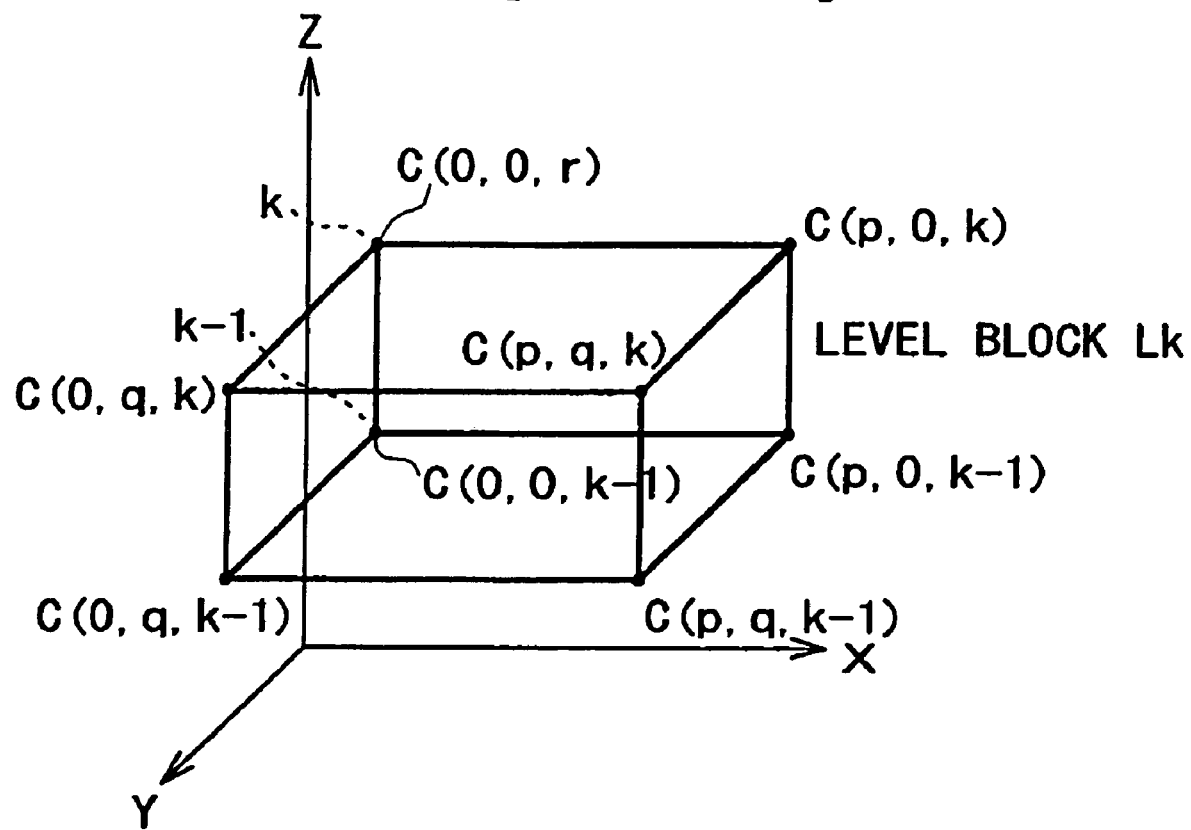
FIG. 7 is a diagram of assistance in explaining a level block according to the embodiment.

FIG. 7 shows a level block Lk. This is a space sandwiched between a grid block at a level boundary value k, that is, a two-dimensional space enclosed by correction values C(0, 0, k), C(p, 0, k), C(0, q, k), and C(p, q, k) and a grid block at a level boundary value k−1, that is, a two-dimensional space enclosed by correction values C(0, 0, k−1), C(p, 0, k−1), C(0, q, k−1), and C(p, q, k−1).

Hence, a level block L is a block for determining levels divided by level boundary values which levels include the signal level of pixel data, regardless of the area (position on the screen) in the grid block.

In three-dimensional correction processing to be described later, the position block and the level block of pixel data are determined, and further the position of the pixel data within the position block and the level of the pixel data within the level block are determined.

A position within a position block will be described with reference to FIG. 8.

Figure 8:
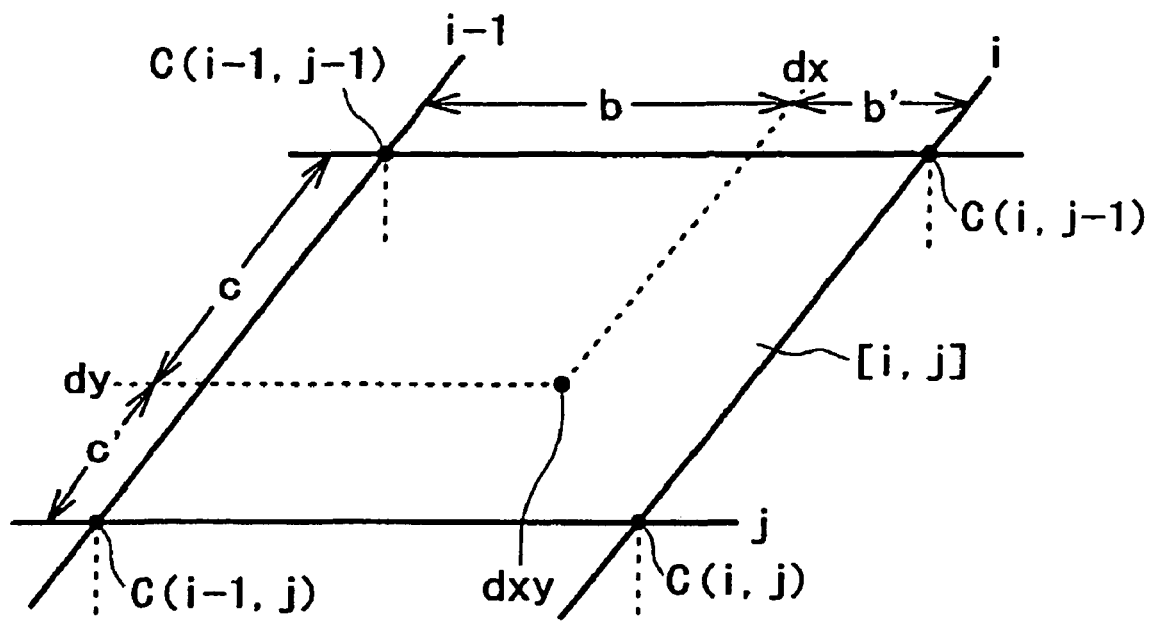
FIG. 8 is a diagram of assistance in explaining a position within the position block according to the embodiment.

FIG. 8 shows a position block A[i, j]. Consideration will now be given to pixel data dxy included in the position block A[i, j]. Suppose that an X coordinate value of the pixel data dxy is dx and a Y coordinate value of the pixel data dxy is dy.

In this case, suppose that a distance from an X coordinate value i−1 to dx is b and a distance from an X coordinate value i to dx is b'. Also, suppose that a distance from a Y coordinate value j−1 to dy is c and a distance from a Y coordinate value j to dy is c'.

The distances b, b', c, and c' are information that can indicate the distance from each of the correction values C(i−1, j−1), C(i, j−1), C(i−1, j), and C(i, j) at two-dimensional coordinates to the pixel data dxy.

For example, it is indicated that from a viewpoint of the correction value C(i−1, j−1), the pixel data dxy is situated at a position at the distance b in the X-direction and at the distance c in the Y-direction.

Thus, the distances b, b', c, and c' are information that can indicate the distances from the four correction values C to the pixel data dxy. The distances b, b', c, and c' are therefore information for calculating a correction value in the horizontal and vertical direction at the position of the pixel data dxy from the set correction values C(i−1, j−1), C(i, j−1), C(i−1, j), and C(i, j).

A position within a position block is thus information indicated by distances from four correction values of a position block.

A level within a level block will next be described with reference to FIG. 9.

Figure 9:
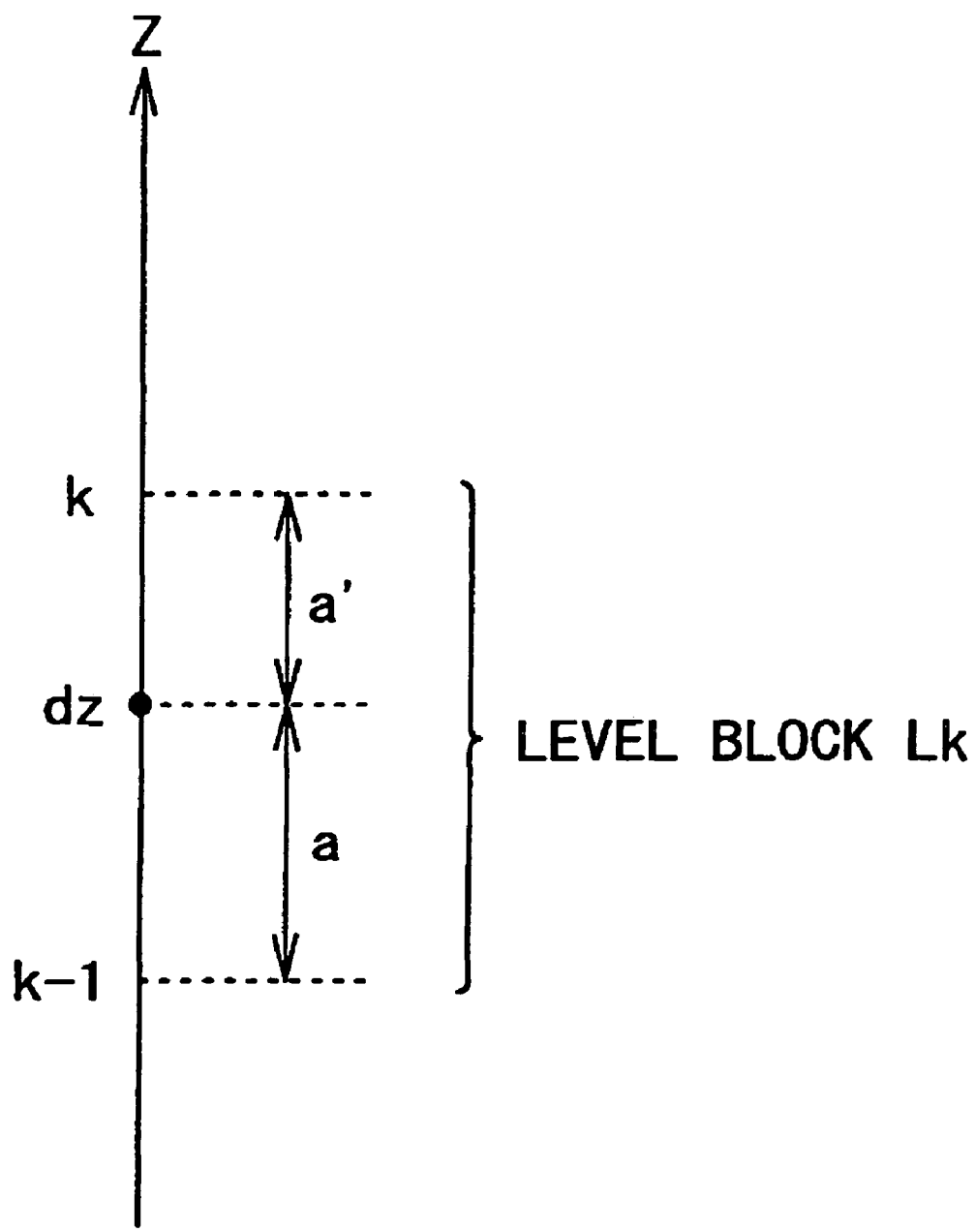
FIG. 9 is a diagram of assistance in explaining a level within the level block according to the embodiment.

FIG. 9 shows a level block Lk only by a Z-axis. The level block Lk is a space in a Z-axis direction between level boundary values k and k−1. Consideration will now be given to pixel data included in the level block Lk. Suppose that a Z coordinate value of the pixel data is dz.

In this case, suppose that on the Z coordinate, a distance from the level boundary value k−1 to dz is a and a distance from the level boundary value k to dz is a'.

The distances a and a' are information that can indicate the distance from each of correction values C at the level boundary value k−1 and the level boundary value k to the pixel data dz.

When consideration is given to a combination of the position within the position block and the level within the level block as described above, it is understood that the distances a, a', b, b', c, and c' are information that can define the position (distance) of the pixel data as viewed from each of the eight correction values in the three-dimensional section where the position block and the level block intersect each other.

That is, when the information of the distances a, a', b, b', c, and c' is obtained as the position within the position block and the level within the level block, a correction value corresponding to the position of the pixel data in the three-dimensional space can be calculated from the eight correction values forming the three-dimensional space.

3. First Example of Configuration of Nonlinear Correction Unit

Examples of configuration of the nonlinear correction unit 16 in FIG. 5 will hereinafter be described one by one as a first to a sixth configuration example.

In each of the configuration examples, the configuration and operation of the nonlinear processing unit 17R, the three-dimensional correction unit 18R, the combining unit 19R, and the ROM 20R corresponding to the digital red primary color signal DRB will be described.

The configuration and operation of the nonlinear processing unit 17G, the three-dimensional correction unit 18G, the combining unit 19G, and the ROM 20G corresponding to the digital green primary color signal DGB or the configuration and operation of the nonlinear processing unit 17B, the three-dimensional correction unit 18B, the combining unit 19B, and the ROM 20B corresponding to the digital blue primary color signal DBB are substantially the same, and therefore their description will be omitted.

Figure 10:
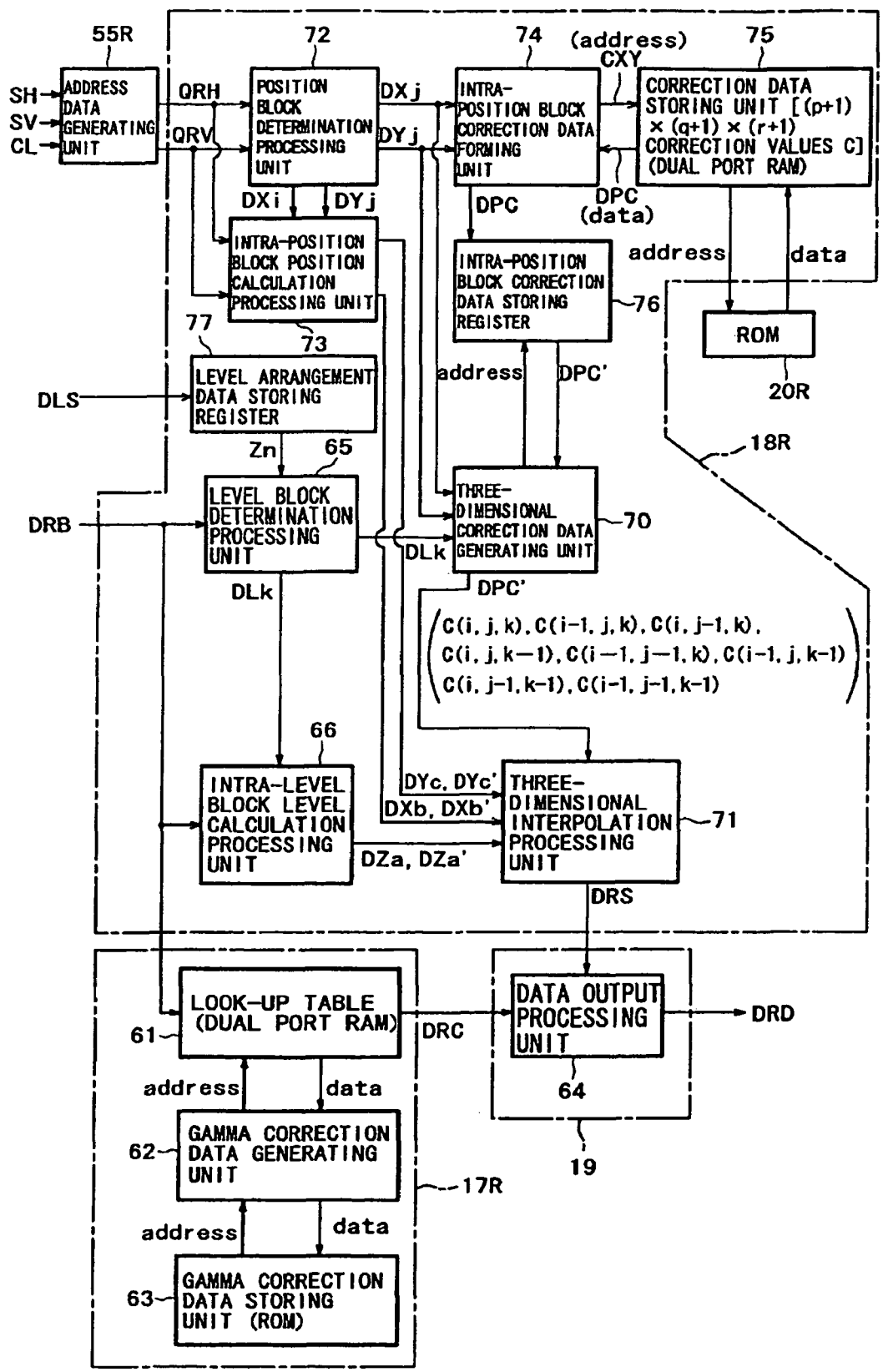
FIG. 10 is a block diagram of a first example of configuration of a nonlinear correction unit according to the embodiment.

As a first example of configuration of the nonlinear correction unit 16, FIG. 10 shows a part for processing the digital red primary color signal DRB in the nonlinear correction unit 16 shown in FIG. 5, that is, a part including the nonlinear processing unit 17R, the three-dimensional correction unit 18R, the combining unit 19R, and the ROM 20R, and the address data generating unit 55R connected to the part as a concrete example of configuration of the nonlinear processing unit 17R and the three-dimensional correction unit 18R.

The nonlinear processing unit 17R includes: a look-up table 61 formed by a dual port RAM, for example; a gamma correction data generating unit 62; and a gamma correction data storing unit 63 formed by a ROM, for example.

The three-dimensional correction unit 18R includes: a level block determination processing unit 65; an intra-level block level calculation processing unit 66; a three-dimensional correction data generating unit 70; a three-dimensional interpolation processing unit 71; a position block determination processing unit 72; an intra-position block position calculation processing unit 73; an intra-position block correction data forming unit 74; a correction data storing unit 75 formed by a dual port RAM, for example; an intra-position block correction data storing register 76; and a level arrangement data storing register 77.

The combining unit 19R is formed by a data output processing unit 64.

In the configuration of FIG. 10, the digital red primary color signal DRB from the white balance adjusting unit 13 in FIG. 5 is supplied to both the nonlinear processing unit 17R and the three-dimensional correction unit 18R.

In the nonlinear processing unit 17R, the digital primary color signal DRB is supplied to the look-up table 61.

The look-up table 61 sequentially detects the signal level of the digital red primary color signal DRB, and refers to a table in response to the detected signal level. Specifically, the look-up table 61 includes a gamma correction data table representing nonlinear characteristics in opposite relation to the input voltage-light transmittance characteristics of the liquid crystal panel included in the liquid crystal display panel unit 52R. Gamma correction data corresponding to the signal level of the digital red primary color signal DRB is sequentially read.

The gamma correction data in the gamma correction data table is stored in the gamma correction data storing unit 63. The gamma correction data generating unit 62 is operated to set the gamma correction data in the gamma correction data table within the look-up table 61.

The nonlinear processing unit 17R as described above compares the signal level of the digital red primary color signal DRB supplied to the nonlinear processing unit 17R with the gamma correction data table, and then sequentially reads gamma correction data corresponding to the signal level of the digital red primary color signal DRB. The gamma correction data is derived as a digital red primary color signal DRC whose signal level is gamma-corrected by nonlinear processing.

The digital red primary color signal DRC thus derived from the look-up table 61 is a signal whose signal level is gamma-corrected to correct the input voltage-light transmittance characteristics shown in FIG. 2, for example, of the liquid crystal panel included in the liquid crystal display panel unit 52R. The digital red primary color signal DRC is supplied to the data output processing unit 64 in the combining unit 19R.

In the three-dimensional correction unit 18R, on the other hand, the digital red primary color signal DRB is supplied to the level block determination processing unit 65 and the intra-level block level calculation processing unit 66.

The level block determination processing unit 65 determines a signal level range, that is, an above-described level block to which the digital red primary color signal DRB belongs.

Specifically, the level block determination processing unit 65 compares level boundary values 1, 2, r set on a Z-axis with the signal level of the digital red primary color signal DRB supplied thereto, determines an upper and a lower level boundary value k and k−1 of the range including the signal level as described with reference to FIG. 7, and thereby determines a level block Lk.

More specifically, letting dz be the signal level of the pixel data as shown in FIG. 9, when $$(k-1) \leq dz < k,$$

the level block Lk is determined.

The level block determination processing unit 65 then sends level block data DLk indicating the determined level block Lk to the intra-level block level calculation processing unit 66 and the three-dimensional correction data generating unit 70.

In response to the level block data DLk, the intra-level block level calculation processing unit 66 performs calculation processing for calculating a level within the level block Lk corresponding to the signal level of the digital red primary color signal DRB supplied to the intra-level block level calculation processing unit 66.

For this calculation processing, the intra-level block level calculation processing unit 66 stores Z coordinate values of all the correction values C shown in FIG. 6.

This calculation processing provides distances a and a' as described with reference to FIG. 9.

Specifically, for example letting dz be a Z coordinate indicating a level corresponding to the signal level of the supplied digital red primary color signal DRB, on the basis of a relation:

$$dz = (k-1) + a = k - a',$$

the distances a and a' are obtained as Z coordinate differences a and a' by operations:

$$a = dz - (k-1)$$

$$a' = k - dz$$

Then, Z coordinate difference data DZa and DZa' indicating the Z coordinate differences a and a' is supplied to the three-dimensional interpolation processing unit 71.

The address data generating unit 55R supplied with the horizontal synchronizing signal SH and the vertical synchronizing signal SV is also supplied with a clock signal CL. The address data generating unit 55R outputs horizontal address data QRH and vertical address data QRV that sequentially change with a cycle of the clock signal CL. The horizontal address data QRH and the vertical address data QRV are supplied to the position block determination processing unit 72 and the intra-position block position calculation processing unit 73.

The position block determination processing unit 72 determines which of position blocks A[1, 1], A[1, 2], A[1, 3], . . . , A[1, q], A[2, 0], . . . , A[2, q], A[3, 0], A[3, q], . . . , A[p, 0], . . . , and A[p, q] within a grid block as described above, which corresponds to an image screen formed on the liquid crystal panel included in the liquid crystal display panel unit 52R, includes the pixel data of interest.

That is, in response to the horizontal address data QRH and the vertical address data QRV from the address data generating unit 55R, the position block determination processing unit 72 detects which of the position blocks A[1, 1] to A[p, q] a pixel (corresponding pixel) on the image screen formed on the liquid crystal panel included in the liquid crystal display panel unit 52R, the pixel corresponding to each piece of pixel data of the supplied digital red primary color signal DRB, belongs to. The position block determination processing unit 72 thereby determines a position block A[i, j], for example, that the corresponding pixel belongs to.

Letting dx be an X coordinate of the corresponding pixel dxy and dy be a Y coordinate of the corresponding pixel dxy as in FIG. 8, when $$(i-1) \leq dx < i$$

$$(j-1) \leq dy < j,$$

it is determined that the corresponding pixel dxy is included in the position block A[i, j].

Then, the position block determination processing unit 72 sends a pair of position block data DXi and DYj indicating the determined position block A[i, j] to the intra-position block position calculation processing unit 73, the intra-position block correction data forming unit 74, and the three-dimensional correction data generating unit 70.

In response to the horizontal address data QRH and the vertical address data QRV and the pair of position block data DXi and DYj indicating the determined position block A[i, j], the intra-position block position-calculation processing unit 73 performs calculation processing for calculating the position of the corresponding pixel within the position block A[i, j].

This calculation processing provides distances b, b', c, and c' as described with reference to FIG. 8.

Specifically, letting dx and dy be an X coordinate and a Y coordinate indicating the position of the corresponding pixel of the supplied digital red primary color signal DRB, on the basis of relations:

$$dx=(i-1)+b=i-b'$$

$$dy=(j-1)+c=j-c',$$

the distances b, b', c, and c' are obtained as X coordinate differences b and b' and Y coordinate differences c and c' by operations:

$$b=dx-(i-1)$$

$$b'=i-dx$$

$$c=dy-(j-1)$$

$$c'=j-dy$$

Then, X coordinate difference data DXb and DXb' indicating the X coordinate differences b and b' and Y coordinate difference data DYc and DYc' indicating the Y coordinate differences c and c' are supplied to the three-dimensional interpolation processing unit 71.

The intra-position block correction data forming unit 74 sends a data reading control signal CXY corresponding to the position block data DXi and DYj to the correction data storing unit 75.

The correction data storing unit 75 stores correction values C(0, 0, 0) . . . C(p, q, r) set at points of intersections in a coordinate space set by a coordinate axis X, a coordinate axis Y, and a coordinate axis Z perpendicular to one another, as shown in FIG. 6.

That is, the correction data storing unit 75 stores the correction values C corresponding to respective coordinates of a total of (p+1) X (q+1) X (r+1) points of intersection.

These correction values C are loaded from the ROM 20R into the correction data storing unit 75.

Therefore, when a plurality of groups of correction values C(0, 0, 0) . . . C(p, q, r) are stored in the ROM 20R, it is possible to change correction values by selecting a group of correction values to be loaded into the correction data storing unit 75.

According to the data reading control signal CXY corresponding to the position block data DXi and DYj which signal is sent from the intra-position block correction data forming unit 74, the correction data storing unit 75 reads a plurality of correction values C included in the position block A[i, j] as correction data DPC, and then outputs the correction data DPC to the intra-position block correction data forming unit 74.

Specifically, the correction data DPC is a total of 4×(r+1) correction values as correction values C(i−1, j−1, 0), C(i−1, j, 0), C(i, j−1, 0), and C(i, j, 0) at coordinates of four points of intersection defining the position block A[i, j] in a plane at a level boundary (Z=0), correction values C(i−1, j−1, 1), C(i−1, j, 1), C(i, j−1, 1), and C(i, j, 1) at coordinates of four points of intersection defining the position block A[i, j] in a plane at a level boundary 1 (Z=1), and correction values C(i−1, j−1, r), C(i−1, j, r), C(i, j−1, r), and C(i, j, r) at coordinates of four points of intersection defining the position block A[i, j] in a plane at a level boundary r (Z=r).

The correction data DPC as the 4×(r+1) correction values C thus read according to the data reading control signal CXY corresponding to the position block data DXi and DYj which signal is sent from the intra-position block correction data forming unit 74 is stored in the intra-position block correction data storing register 76 via the intra-position block correction data forming unit 74.

In response to the pair of position block data DXi and DYj indicating the position block A[i, j] from the position block determination processing unit 72 and the level block data DLk indicating the level block Lk from the level block determination processing unit 65, the three-dimensional correction data generating unit 70 reads a total of eight correction values C at the intersection coordinates defining the position block A[i, j] in a Z(k−1) plane and a Zk plane defining the level block Lk, among the 4×(r+1) correction values C stored in the intra-position block correction data storing register 76.

Specifically, the three-dimensional correction data generating unit 70 sends a data reading control signal (address) for reading the eight correction values C at the intersection coordinates to the intra-position block correction data storing register 76. Thereby the total of eight correction values C are read from the intra-position block correction data storing register 76 as correction data DPC' as the four correction values C(i−1, j−1, k−1), C(i−1, j, k−1), C(i, j−1, k−1), and C(i, j, k−1) defining the position block A[i, j] in the plane at the level boundary value (k−1), and the four correction values C(i−1, j−1, k), C(i−1, j, k), C(i, j−1, k), and C(i, j, k) defining the position block A[i, j] in the plane at the level boundary value k. The correction data DPC' is supplied through the three-dimensional correction data generating unit 70 to the three-dimensional interpolation processing unit 71.

The three-dimensional interpolation processing unit 71 is supplied with a total of six pieces of coordinate difference data as the Z coordinate difference data DZa and DZa' indicating the Z coordinate differences a and a', the Z coordinate difference data DZa and DZa' being calculated by the intra-level block level calculation processing unit 66, and the X coordinate difference data DXb and DXb' indicating the X coordinate differences b and b' and the Y coordinate difference data DYc and DYc' indicating the Y coordinate differences c and c', the X coordinate difference data DXb and DXb' and the Y coordinate difference data DYc and DYc' being calculated by the intra-position block position calculation processing unit 73.

Using the six pieces of coordinate difference data as parameters, the three-dimensional interpolation processing unit 71 performs three-dimensional interpolation processing with the total of eight pieces of correction data DPC', that is, the eight correction values C(i−1, j−1, k−1), C(i−1, j, k−1), C(i, j−1, k−1), C(i, j, k−1), C(i−1, j−1, k), C(i−1, j, k), C(i, j−1, k), and C(i, j, k) at the intersection coordinates read from the intra-position block correction data storing register 76.

Thereby a signal resulting from the three-dimensional correction of the signal level of the pixel data of the digital red primary color signal DRB in which the corresponding pixel is set is formed, and is then sent out as a three-dimensionally corrected digital red primary color signal DRS from the three-dimensional interpolation processing unit 71.

The three-dimensional interpolation processing with the eight correction values, performed by the three-dimensional interpolation processing unit 71 and using, as parameters, the Z coordinate difference data DZa and DZa', the X coordinate difference data DXb and DXb', and the Y coordinate difference data DYc and DYc', is linear interpolation processing, for example, and corresponds to correction data corresponding to a coordinate position (X, Y, Z) expressed as follows:

$$(X, Y, Z) = C(i-1, j-1, k-1) \times b' \times c' \times a' + C(i, j-1, k-1) \times b \times c' \times a' + C(i-1, j, k-1) \times b' \times c \times a' + C(i, j, k-1) \times b \times c \times a' + C(i-1, j-1, k) \times b' \times c' \times a + C(i, j-1, k) \times b \times c' \times a + C(i-1, j, k) \times b' \times c \times a + C(i, j, k) \times b \times c \times a$$

The three-dimensionally corrected digital red primary color signal DRS thus sent out from the three-dimensional interpolation processing unit 71 is supplied to the data output processing unit 64 of the combining unit 49R. Then, the data output processing unit 64 combines the digital red primary color signal DRC from the nonlinear processing unit 47R with the three-dimensionally corrected digital red primary color signal DRS, and thereby forms a gamma-corrected and three-dimensionally corrected digital red primary color signal DRD.

The nonlinear correction unit 16 makes gamma correction and three-dimensional correction by the configuration described thus far. Thereby, when a nonlinearly corrected video signal is obtained, the nonlinearly corrected video signal is corrected for undesired variations in brightness and chromaticity according to the horizontal and vertical position on the display screen, and further for undesired variations in brightness and chromaticity of the display screen obtained on the image display unit which variations are caused by variations in level of the original video signal.

The nonlinear correction unit 16 in this example further includes the level arrangement data storing register 77 in the three-dimensional correction unit 18R.

The level arrangement data storing register 77 retains a group of (r+1) actual level values as boundary level values described as the boundary levels 1, 2, . . . r in the Z-axis direction.

Figure 11:
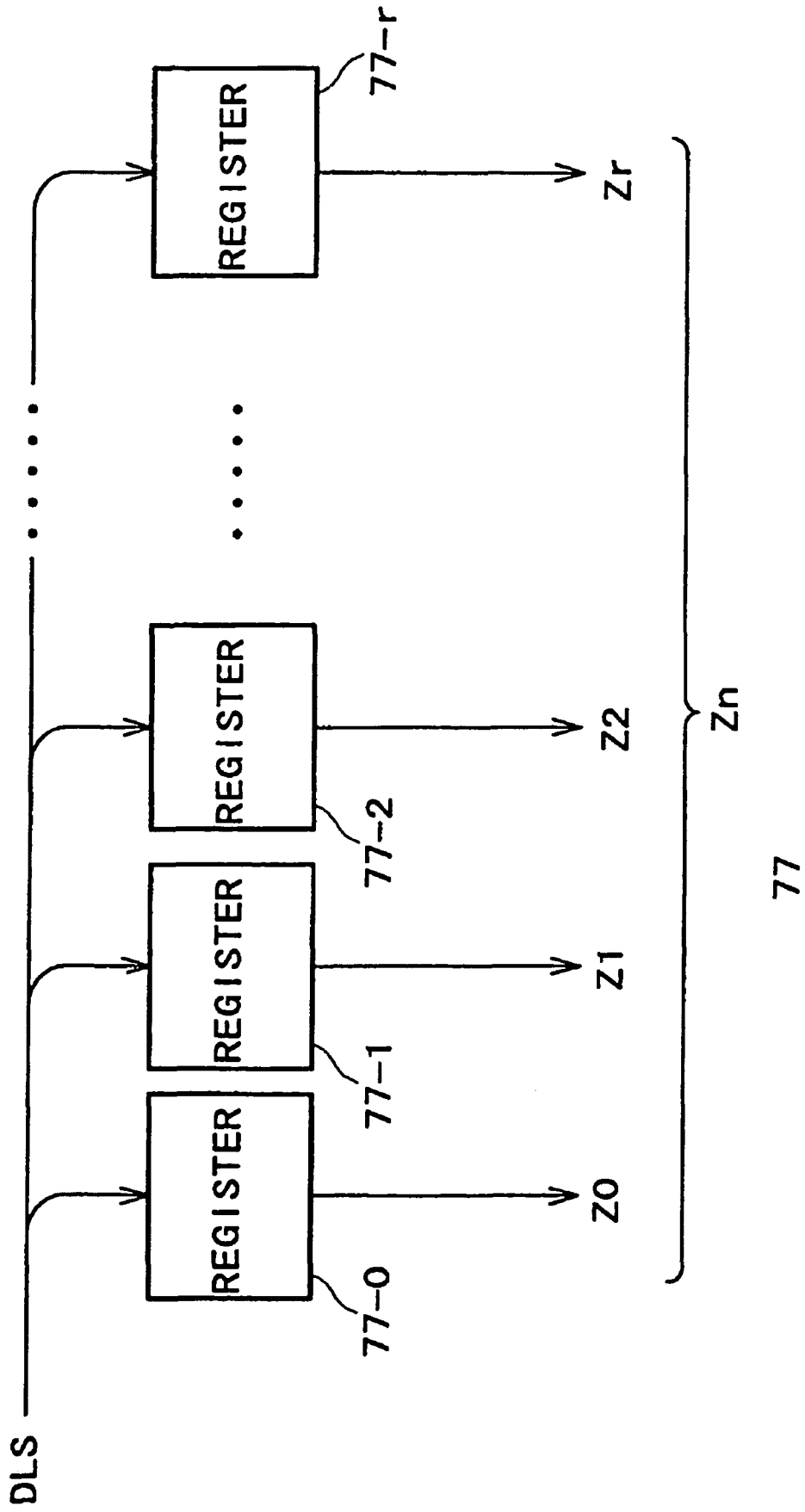
FIG. 11 is a block diagram of a level arrangement data storing register in the first example of configuration of the nonlinear correction unit according to the embodiment.

The level arrangement data storing register 77 has (r+1) registers 77-0, 77-1, 77-2, . . . 77-r, as shown in FIG. 11.

Supposing that the boundary level values described as the boundary levels 1, 2, . . . r in the Z-axis direction in FIG. 6 are denoted as Z0, Z1, Z2, . . . Zr, the boundary level values Z0, Z1, Z2, . . . Zr are set in the registers 77-0, 77-1, 77-2, . . . 77-r, respectively, by a register writing control signal DLS from the CPU 1 shown in FIG. 5.

The level arrangement data storing register 77 supplies the level block determination processing unit 65 with the boundary level values Z0, Z1, Z2, . . . Zr stored in the registers 77-0, 77-1, 77-2, . . . 77-r, respectively, as level arrangement data Zn.

The level block determination processing unit 65 uses the level arrangement data Zn (Z0 to Zr) supplied thereto as actual level boundary values of the boundary levels 1, 2, . . . r in the Z-axis direction to perform the above-described level block determination processing.

That is, in this example, the CPU 1 rewrites the boundary level values Z0, Z1, Z2, . . . Zr by the register writing control signal DLS, whereby the actual level boundary values of the boundary levels 1, 2, . . . r in the Z-axis direction can be variably set on an arbitrary basis.

For example, suppose that level determination is made with a 1024 resolution in the Z-axis direction and that there are eight divided level blocks.

Figure 12:
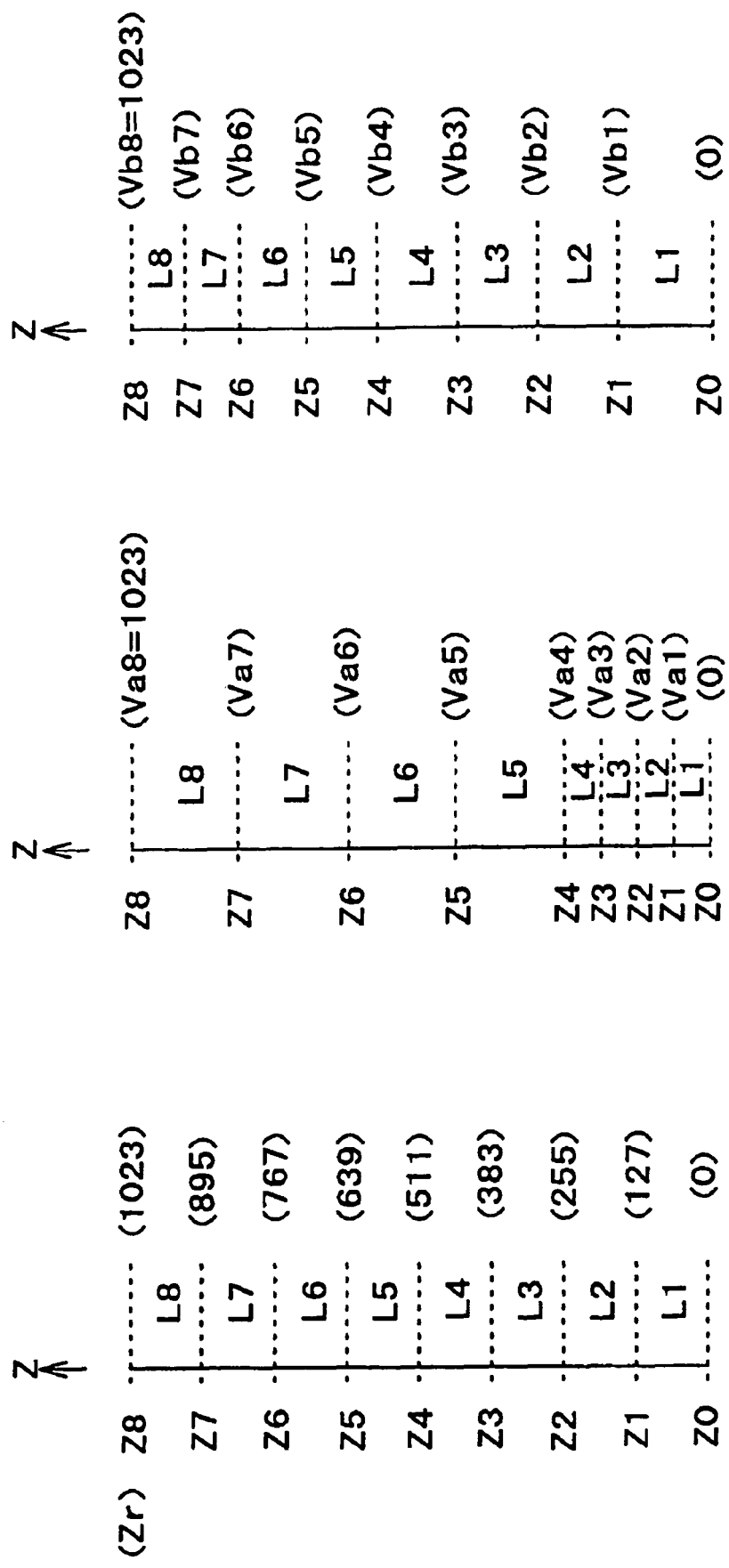
FIGS. 12A, 12B, and 12C are diagrams of assistance in explaining the variable setting of level boundary values according to the embodiment.

In this case, when the boundary levels 1, 2, . . . r are to be arranged at regular intervals, it suffices to write boundary level values Z0 to Zr (=Z8) as shown in FIG. 12A to the registers 770, 77-1, 77-2, . . . 77-r, respectively.

Specifically, Z0=0, Z=127, Z2=255, . . . Z8 (Zr)=1023 are set.

Then, the level block determination processing unit 65 determines that eight level blocks L1, L2, . . . L8 are set at regular intervals, to perform the above-described level block determination processing.

Figure 13:
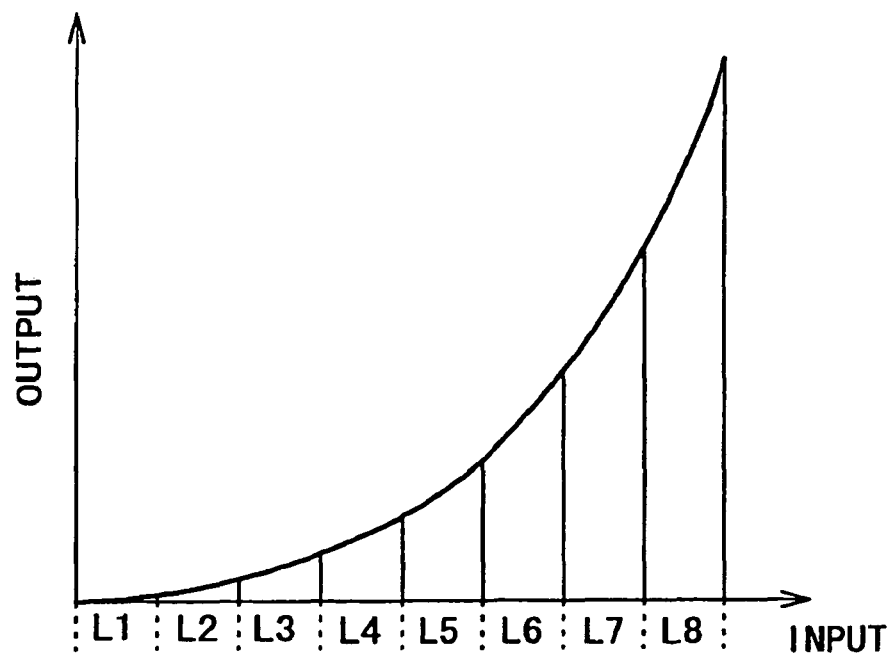
FIG. 13 is a diagram of assistance in explaining an example of the setting of level boundary values according to the embodiment.

In a case of gamma correction characteristics when the display device is a CRT, for example, the level blocks L1 to L8 at regular intervals with respect to input data level as shown in FIG. 13 are set.

Figure 14:
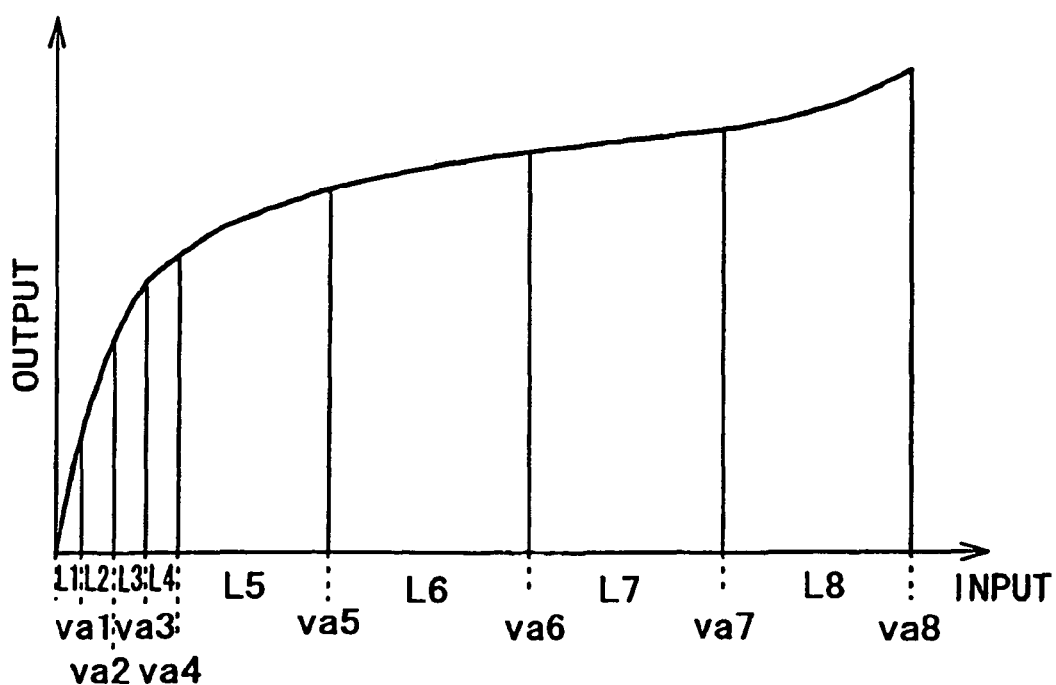
FIG. 14 is a diagram of assistance in explaining an example of the setting of level boundary values according to the embodiment.

Gamma correction characteristics in a case of a liquid crystal panel are shown in FIG. 14. In the case of such characteristics, three-dimensional correction can be made with higher accuracy by setting smaller level blocks in a range with a steep gradient.

In such a case, the CPU 1 writes Z0=0, Z1=va1, Z2=va2, . . . Z8 (Zr)=va8 (=1023) as boundary level values Z0 to Zr (=Z8) as shown in FIG. 12B to the registers 77-0, 77-1, 77-2, . . . 77-r.

Then, the level block determination processing unit 65 determines that eight level blocks L1, L2, . . . L8, which are smaller in a low-level range and larger in a high-level range, are set, to perform the above-described level block determination processing.

Thus, as shown in FIG. 14, the level blocks can be set according to a gamma correction characteristic curve of the liquid crystal panel.

Figure 15:
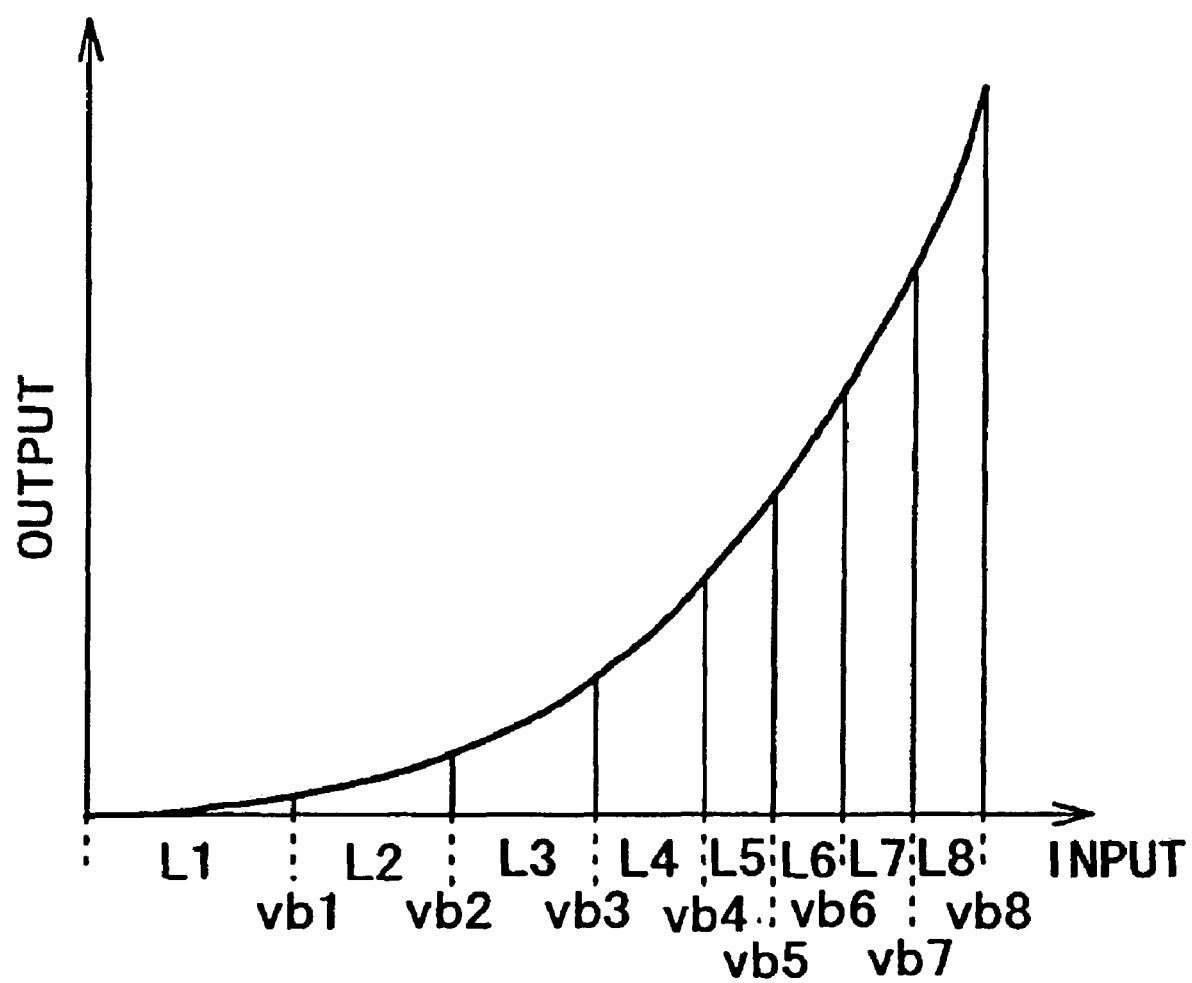
FIG. 15 is a diagram of assistance in explaining an example of the setting of level boundary values according to the embodiment.

Further, as with FIG. 13, FIG. 15 shows gamma correction characteristics in the case of a CRT. Also in the case of such characteristics, three-dimensional correction can be made with higher accuracy by setting smaller level blocks in a range with a steep gradient.

In this case, the CPU 1 writes Z0=0, Z1=vb1, Z2=vb2, . . . Z8 (Zr)=vb8 (=1023) as boundary level values Z0 to Zr (=Z8) as shown in FIG. 13C to the registers 77-0, 77-1, 77-2, . . . 77-r.

Then, the level block determination processing unit 65 determines that eight level blocks L1, L2, . . . L8, which are smaller in a high-level range and larger in a low-level range, are set, to perform the above-described level block determination processing.

Thus, as shown in FIG. 15, the level blocks can be set according to a gamma correction characteristic curve of the CRT.

The examples of level boundary arrangement shown in FIGS. 12A to 12C and FIGS. 13 to 15 are mere examples. That is, in the first example, according to the type of display device or as an operation in an adjustment process or the like, the CPU 1 writes actual level boundary values to the registers 77-0, 77-1, 77-2, . . . 77-r, whereby level blocks can be variably set on an arbitrary basis.

It is thus possible to make optimum level block setting corresponding to the type of display device, variations in characteristics of each individual device and the like, and thereby improve the accuracy of the three-dimensional correction.

It is to be noted that in the first example, it suffices only to set level boundary values (boundaries of level blocks) variably, and that it is not necessary to change the correction data C according to change of the level boundary values. That is, in a case of a level boundary (Z-axis) k, for example, even when the k value is changed arbitrarily, correction values C(0, 0, k) to C(p, q, k) at the k level are used as they are as correction values C(0, 0, k) to C(p, q, k) at the changed k value.

Hence, variably setting level boundary values does not mean that an enormous amount of correction values C needs to be prepared in consideration of ranges of the variable level boundary values.

4. Second Example of Configuration of Nonlinear Correction Unit

Figure 16:
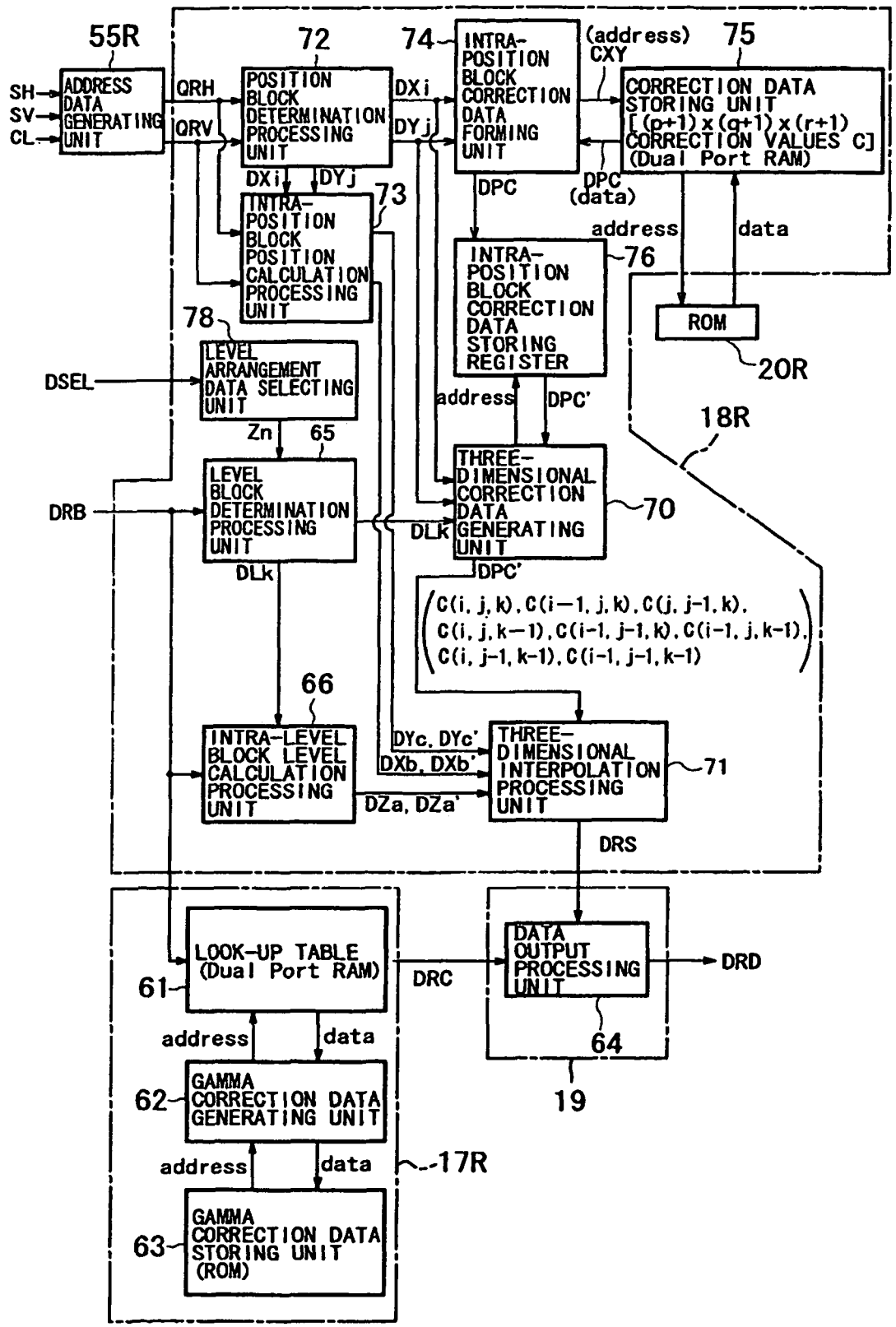
FIG. 16 is a block diagram of a second example of configuration of the nonlinear correction unit according to the embodiment.

FIG. 16 shows a second example of configuration of the nonlinear correction unit 16. In the second to sixth configuration examples to be described below, the same parts as in the first configuration example of FIG. 10 are identified by the same reference numerals, and their repeated description will be omitted. Basic operations for gamma correction and three-dimensional correction are the same.

The second configuration example of FIG. 16 is different from the foregoing first configuration example in that the configuration example of FIG. 16 has a level arrangement data selecting unit 78 in place of the level arrangement data storing register 77 in FIG. 10.

Figure 17:
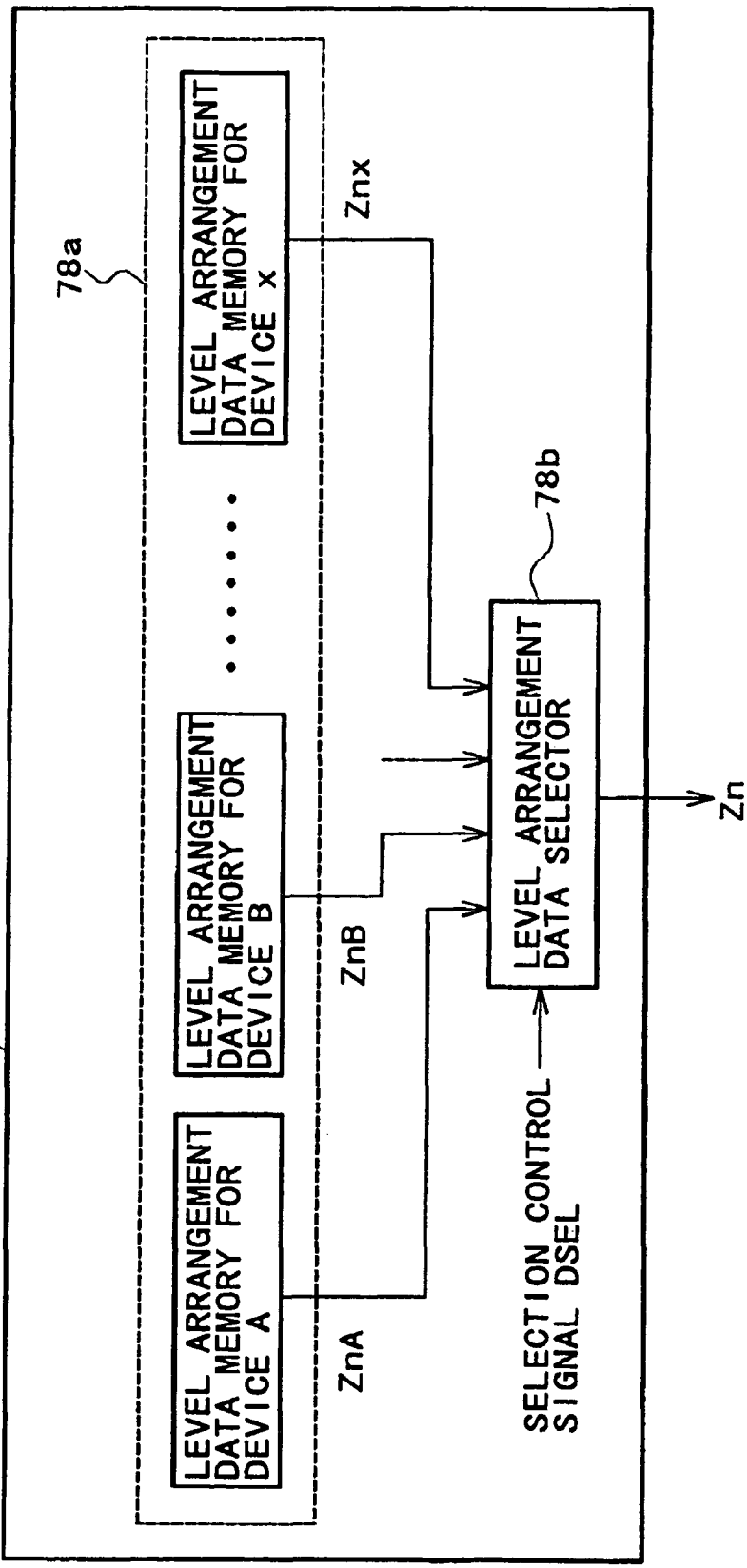
FIG. 17 is a block diagram of a level arrangement data selecting unit in the second example of configuration of the nonlinear correction unit according to the embodiment.

The level arrangement data selecting unit 78 is configured as shown in FIG. 17. Specifically, the level arrangement data selecting unit 78 includes a level arrangement data memory 78a and a level arrangement data selector 78b.

The level arrangement data memory 78a has memory areas set in correspondence with various types of display devices A, B, ... x, respectively. The areas have level arrangement data ZnA, ZnB, ... Znx stored therein in correspondence with the display devices A, B, ... x, respectively.

The level arrangement data ZnA, for example, is a data group of boundary level values Z0 to Zr corresponding to a certain display device A (liquid crystal panel, for example).

Further, the level arrangement data ZnB, for example, is a data group of boundary level values Z0 to Zr corresponding to a certain display device B (CRT, for example).

The level arrangement data selector 78b selects one of the pieces of level arrangement data ZnA, ZnB, ... Znx on the basis of a selection control signal DSEL from the CPU 1, and then reads the piece of data from the level arrangement data memory 78a. Boundary level values Z0, Z1, Z2, ... Zr as the selected level arrangement data Zn* are supplied as level arrangement data Zn to a level block determination processing unit 65.

The level block determination processing unit 65 in FIG. 16 performs the above-described level block determination processing using the level arrangement data Zn (Z0 to Zr) supplied thereto as actual level boundary values of boundary levels 1, 2, ... r in a Z-axis direction.

That is, in this example, the CPU 1 can variably set the boundary level values Z0, Z1, Z2, ... Zr used in level block determination in the level block determination processing unit 65 by the selection control signal DSEL.

For example, suppose that the boundary level values Z0 to Zr (=Z8) as the level arrangement data ZnA stored in the level arrangement data memory 78a are Z0=0, Z1=va1, Z2=va2, ... Z8 (Zr)=va8 (=1023) as shown in FIG. 12B. Then, when the level arrangement data ZnA is selected by the selection control signal DSEL, a state of level blocks as shown in FIG. 14 is obtained.

Further, suppose for example that the boundary level values Z0 to Zr (=Z8) as the level arrangement data ZnB stored in the level arrangement data memory 78a are Z0=0, Z1=vb1, Z2=vb2, ... Z8 (Zr)=vb8 (=1023) as shown in FIG. 12C. Then, when the level arrangement data ZnB is selected by the selection control signal DSEL, a state of level blocks as shown in FIG. 15 is obtained.

Thus, in the second configuration example, level blocks can be set variably within the variety of the pieces of level arrangement data ZnA, ZnB, ... stored in the level arrangement data memory 78a.

Also in this case, when various level arrangement data ZnA, ZnB, ... are stored in correspondence with various types of display devices, for example, the accuracy of three-dimensional correction can be improved by making level block setting in correspondence with the various types of display devices.

Further, when a plurality of pieces of level arrangement data ZnA1, ZnA2, ... corresponding to a certain type of display device are stored to deal with specific display devices, for example, the accuracy of three-dimensional correction can be improved by making optimum level block setting in correspondence with variations in characteristics of each individual device or the like.

Of course, as compared with the foregoing first configuration example that can variably set boundary level values on a completely arbitrary basis, the second example makes level block setting less freely, because the variable level block setting of the second example is made within the variety of the pieces of level arrangement data ZnA, ZnB, ... stored in the level arrangement data memory 78a. However, this virtually presents no practical problem when each of the pieces of level arrangement data ZnA, ZnB, ... stored is made to be highly practical data.

Further, it suffices to select optimum data for practical variable setting, and therefore the level block setting processing is simplified. For example, a setting operation in an adjustment process is simplified, and a load of processing software on the CPU 1 can be reduced.

Furthermore, the second example can be considerably reduced in circuit scale as compared with the first configuration example, thus providing a highly practical circuit.

Depending on design of data values as the level arrangement data ZnA, ZnB, ... to be stored, in particular, the reduction in circuit scale can be furthered.

In the level block determination processing unit 65 as a digital processing circuit, when each level boundary value is a power of 2, calculation load is reduced. The circuit configuration of the level block determination processing unit 65 can therefore be simplified. On the other hand, when each level boundary value that can be set is completely arbitrary, as in the first configuration example, even level boundary values that are not a power of 2 need to be handled. It is therefore necessary to enhance calculating power, which causes an increase in circuit scale.

When a power of 2 (for example a value such as ... 32, 64, 128, 192, 256, ... ) is used as each of the level boundary values of the stored level arrangement data ZnA, ZnB, ..., a level boundary value other than a power of 2 cannot be set. Hence, the level block determination processing unit 65 can be substantially simplified.

Thus, in the second configuration example, the accuracy of three-dimensional correction can be improved to a satisfactory level, and also the circuit scale can be reduced. The second configuration example therefore has an effect of providing a highly practical nonlinear processing device.

5. Third Example of Configuration of Nonlinear Correction Unit

Figure 18:
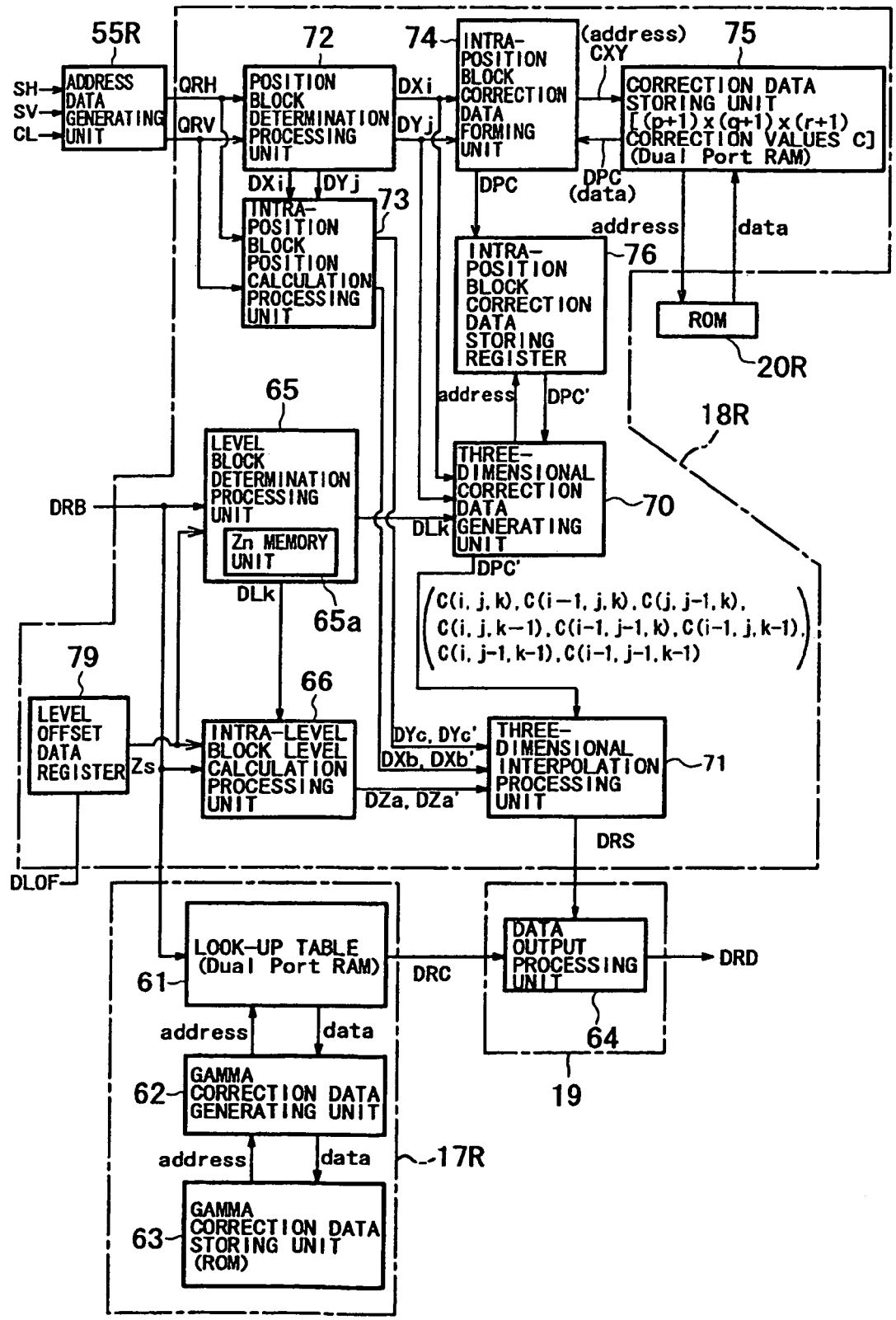
FIG. 18 is a block diagram of a third example of configuration of the nonlinear correction unit according to the embodiment.

A third example of configuration of the nonlinear correction unit 16 will next be described with reference to FIG. 18.

The third configuration example is not provided with means for variably setting level arrangement data Zn itself as in the foregoing first and second configuration examples, but is provided with a level offset data register 79.

Since the third configuration example does not variably set level arrangement data Zn itself, a level block determination processing unit 65 is provided with a memory unit 65a for storing fixed level arrangement data Zn (Z0, Z1, ... , Zr).

Figure 19A:
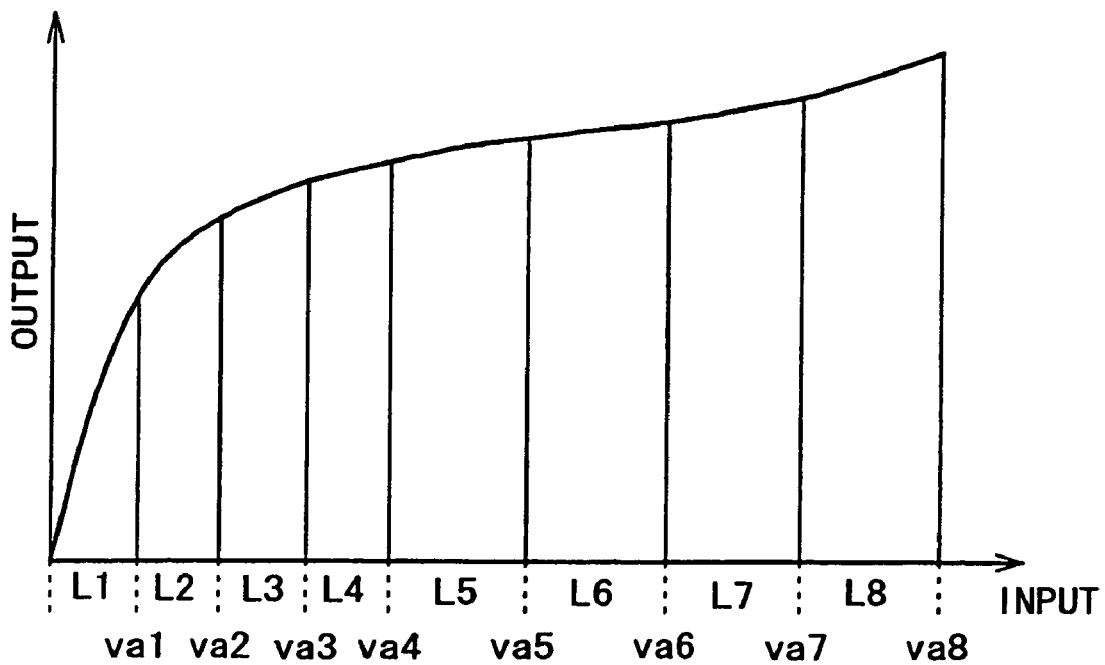
FIGS. 19A and 19B are diagrams of assistance in explaining the offsetting of level boundary values in the third and a fourth configuration example of the embodiment.

When a liquid crystal panel is used as a display device as in FIG. 5, for example, the memory unit 65a stores the level arrangement data Z0, Z1, Zr as values corresponding to va1, va2, . . . , va8 shown in FIG. 19A, for example, and hence level blocks L1 to L8 set therein as shown in FIG. 19A.

An offset value Zs is written to the level offset data register 79 by a writing control signal DLOF from the CPU 1. The offset value Zs is supplied to the level block determination processing unit 65 and an intra-level block level calculation processing unit 66.

The level block determination processing unit 65 and the intra-level block level calculation processing unit 66 shift level boundary values Z1 to Zr by the offset value Zs, and then perform level block determination processing and intra-level block level calculation processing.

As described in the first configuration example, the level block determination processing unit 65 determines a level block to which the digital red primary color signal DRB belongs.

Specifically, the level block determination processing unit 65 compares level boundary values 1 to r set on a Z-axis (in this case, Z1 to Zr stored in the memory unit 65) with signal level of the digital red primary color signal DRB supplied thereto, determines an upper and a lower level boundary value k ($=Zk$) and k−1 ($=Zk-1$) of a range including the signal level as described with reference to FIG. 7, and thereby determines a level block Lk. That is, basically, when the signal level dz of the pixel data is $Zk-1 \leq dz \leq Zk$, the level block Lk is determined.

In a case where each level block is shifted to a lower level by the offset value Zs, for example, the level block determination processing unit 65 in the third configuration example determines the level block Lk when the signal level dz of the pixel data is $(Zk-1)-Zs \leq dz < Zk-Zs.$ In a case where each level block is shifted to a higher level by the offset value Zs, the level block determination processing unit 65 in the third configuration example determines the level block Lk when the signal level dz of the pixel data is $(Zk-1)+Zs \leq dz < Zk+Zs.$ In response to level block data DLk, the intra-level block level calculation processing unit 66 calculates Z coordinate differences a and a' as a level within the level block Lk corresponding to the signal level of the digital red primary color signal DRB supplied to the intra-level block level calculation processing unit 66. The intra-level block level calculation processing unit 66 then supplies the Z coordinate differences a and a' as Z coordinate difference data DZa and DZa' to a three-dimensional interpolation processing unit 71. In this example, when each level block is shifted to a lower level by the offset value Zs, the Z coordinate differences a and a' are obtained by the following operations using the offset value Zs.

$a = dz(Zk-1)+Zs$ $a' = Zk-dz-Zs$

When each level block is shifted to a higher level by the offset value Zs, the Z coordinate differences a and a' may be obtained by the following:

$a = dz = (Zk-1)-Zs$ $a' = Zk-dz+Zs$

Figure 19B:
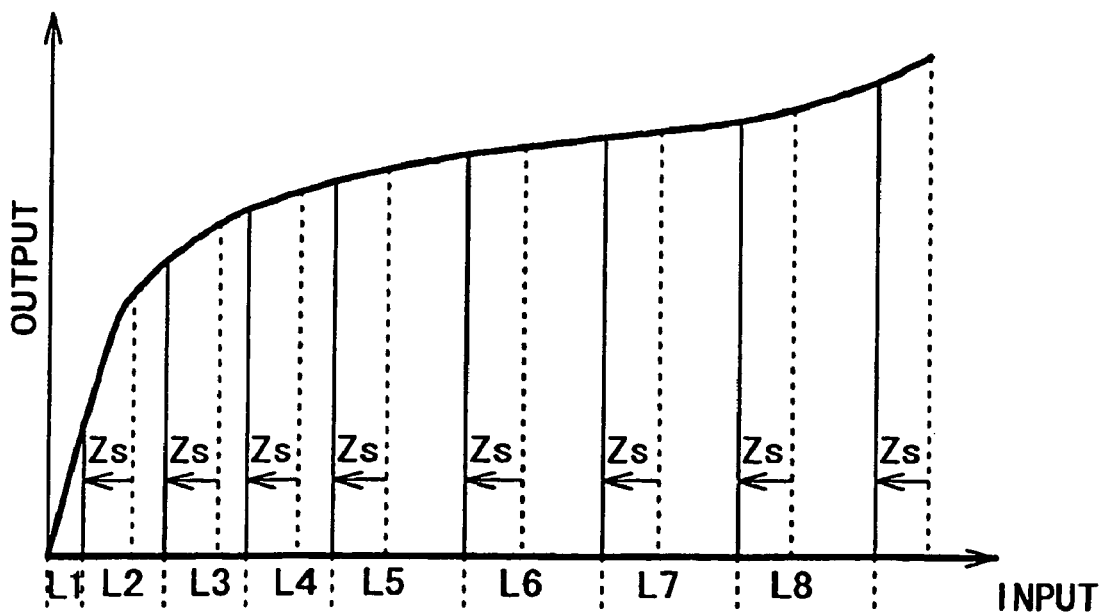

The level block determination processing unit 65 and the intra-level block level calculation processing unit 66 perform the above-described processing using the offset value Zs. Actual level boundaries are thereby shifted by the offset value Zs from a state of FIG. 19A to a state of FIG. 19B, for example. That is, level block settings are changed.

Thus, the third configuration example can improve the accuracy of three-dimensional correction by shifting the level boundary values by the offset value Zs, or by the CPU 1 setting an optimum offset value Zs by the writing control signal DLOF.

Further, level block variable setting is enabled only by providing the level offset data register 79. The third configuration example is thus of a simple circuit configuration and hence highly practical.

Further, when each of the level boundary values Z0 to Zr stored in the memory unit 65a is a power of 2, the circuit configuration of the level block determination processing unit 65 can also be simplified.

It is to be noted that while one offset value Zs can be arbitrarily set in this example, a plurality of offset values may be set, for example. For example, different offset values Zs may be given in correspondence with level boundary values in a low-level range, a middle-level range, and a high-level range, respectively, or offset values may be individually given to each of the level boundary values Z0 to Zr. This allows more accurate level block setting.

6. Fourth Example of Configuration of Nonlinear Correction Unit

Figure 20:
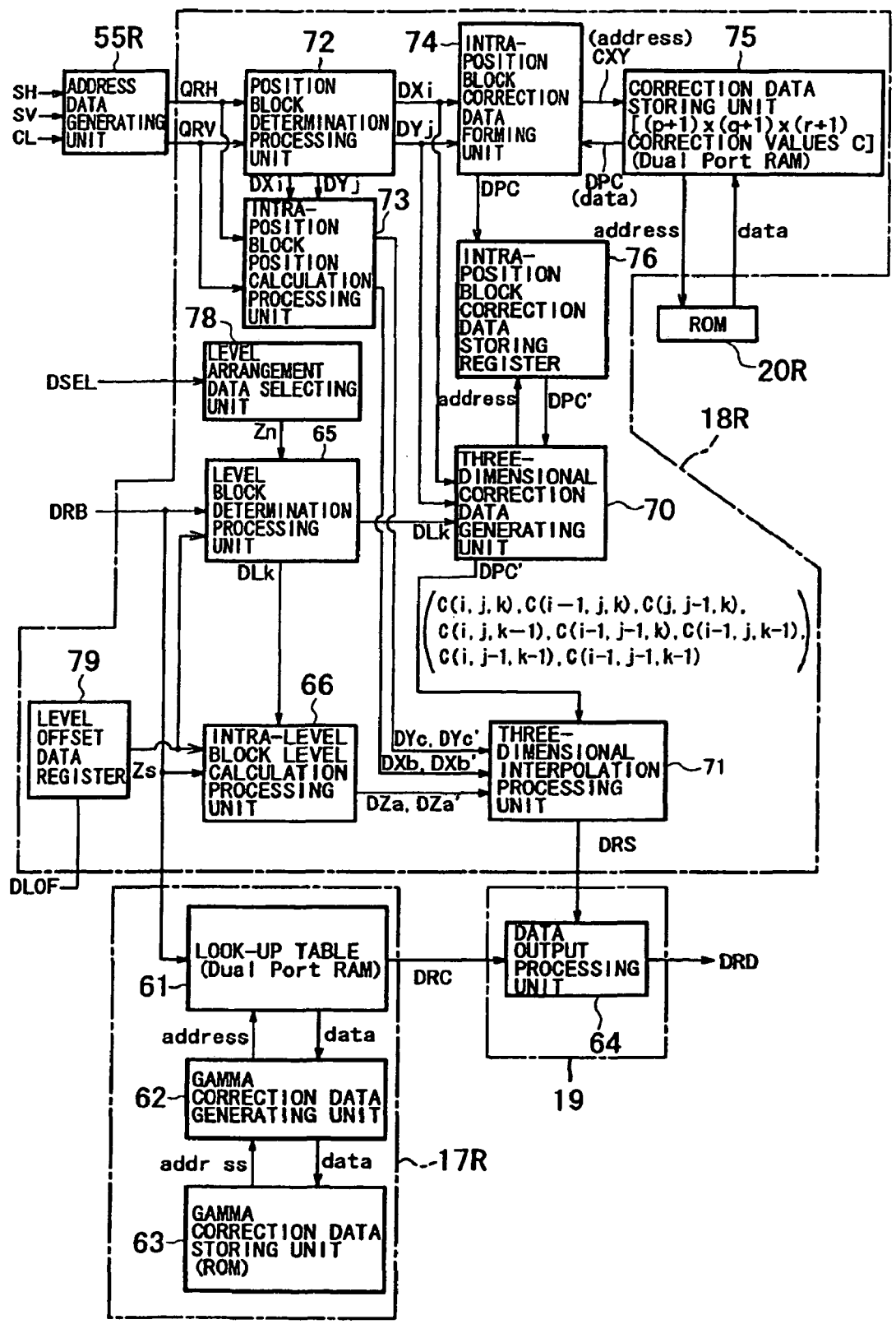
FIG. 20 is a block diagram of the fourth example of configuration of the nonlinear correction unit according to the embodiment.

A fourth example of configuration of the nonlinear correction unit 16 will next be described with reference to FIG. 20.

The fourth configuration example is a combination of the foregoing second and third configuration examples. Specifically, the fourth configuration example has a level arrangement data selecting unit 78 configured as shown in FIG. 17, for example, whereby level arrangement data Zn can be variably set by a selection control signal DSEL from the CPU 1.

The fourth configuration example further includes an offset data register 79. An offset value Zs is set by a writing control signal DLOF from the CPU 1, and then supplied to a level block determination processing unit 65 and an intra-level block level calculation processing unit 66, whereby level block boundary values (level arrangement data) are shifted as described in the foregoing third configuration example.

Thus, the fourth configuration example can make appropriate level block setting in accordance with the display device or the like as in the second configuration example, and further adjust the level block setting to a more appropriate state by setting the offset value Zs.

7. Fifth Example of Configuration of Nonlinear Correction Unit

A fifth example of configuration of the nonlinear correction unit 16 will next be described.

The fifth configuration example does not change level boundary values (level block setting) in a level direction. The fifth configuration example attains a proper relative position relation between an image area of a video signal and a grid block in a horizontal and a vertical direction.

It is best that an upper edge, a lower edge, a left edge, and a right edge of a grid block of correction values in the horizontal and vertical two-dimensional directions coincide with those of an image area. That is, it is ideal if coordinates (0, 0), (p, 0), (0, q), and (p, q) at four corners of the grid block of FIG. 3, for example, represent four corners of the image area as they are.

However, the image area varies according to resolution of the image, while it is impractical for a reason of increase in circuit scale or the like to prepare a large number of grid blocks (correction values) to deal with various resolutions.

Accordingly, one grid block is provided for display devices with various resolutions. However, this results in a vertically and horizontally asymmetric relation between the grid block and the image area. Thus, correction of nonlinear characteristics in the two-dimensional directions may result in an unnatural image state.

Figure 23A:
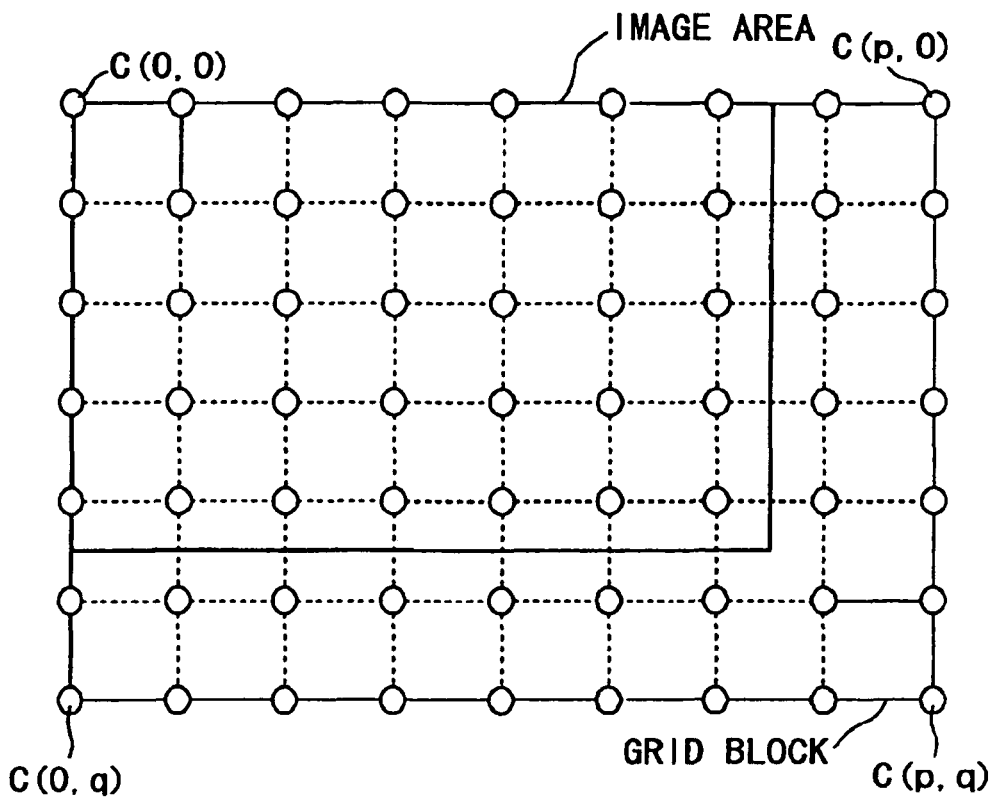
FIGS. 23A and 23B are diagrams of assistance in explaining a relation between an image area and a grid block in the fifth and the sixth configuration example of the embodiment.

When a nonlinear correction circuit in which a grid block provided for a device with a high resolution is set is incorporated in a signal processing system for a display device with a low resolution, for example, a relation between the grid block and the image area is as shown in FIG. 23A.

That is, since the grid block and the image area are made to correspond to each other by using coordinates (0, 0) as an origin, amounts of displacement between the grid block and the image area are asymmetric in both the horizontal direction and the vertical direction. This results in an unnatural image.

Accordingly, the fifth example is configured to be able to adjust the relative position relation between the image area and the grid block in the horizontal and vertical directions so that the unnaturalness of the image is eliminated by correction even when the resolution of the display device does not match the grid block.

Figure 21:
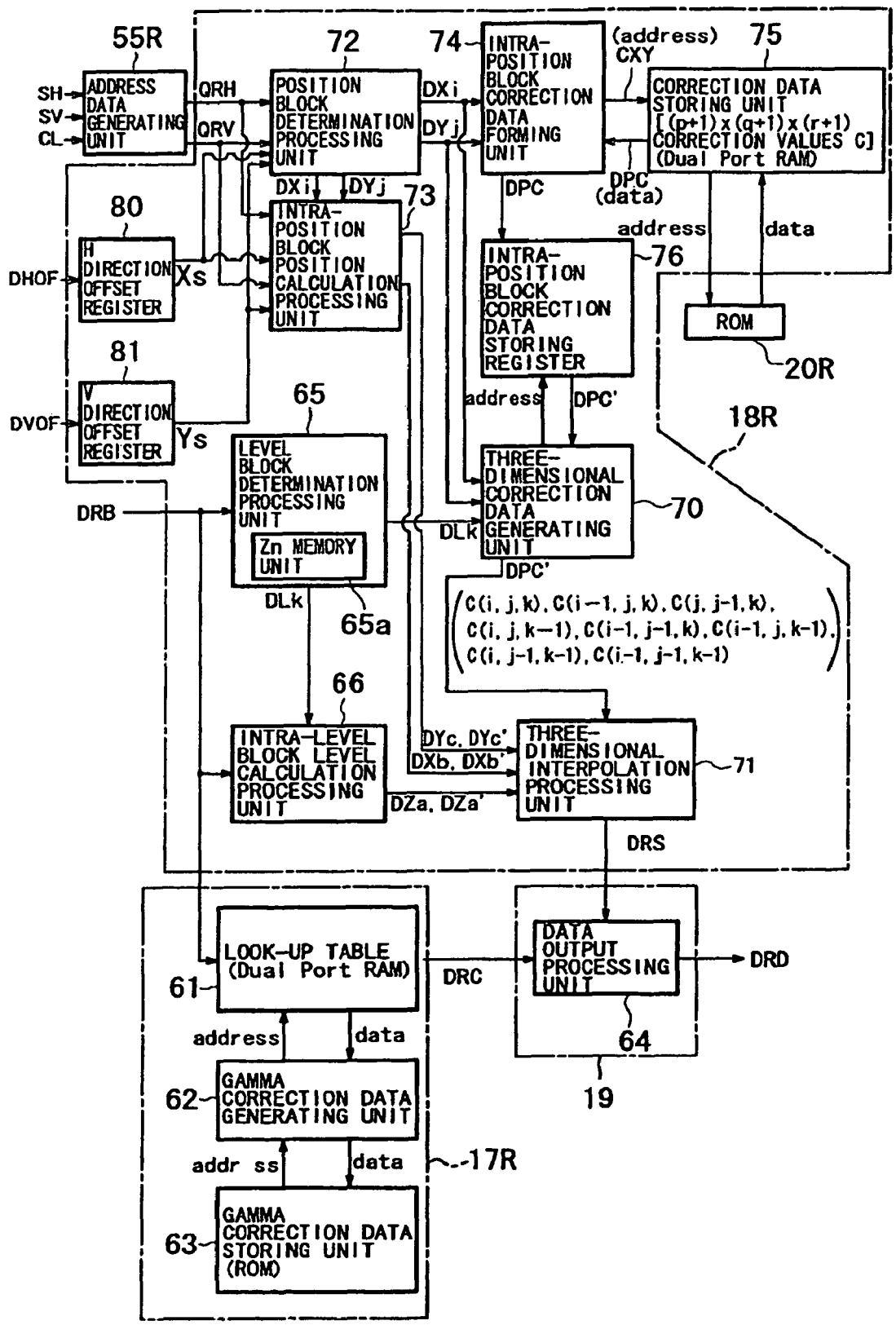
FIG. 21 is a block diagram of a fifth example of configuration of the nonlinear correction unit according to the embodiment.

The fifth configuration example for this purpose is shown in FIG. 21.

The fifth configuration example has an H direction offset register 80 and a V direction offset register 81.

Since unlike the foregoing configuration examples, the fifth configuration example does not variably set level arrangement data Zn, a level block determination processing unit 65 is provided with a memory unit 65a for storing fixed level arrangement data Zn (Z0, Z1, . . . , Zr). When a liquid crystal panel is used as a display device as in FIG. 5, for example, the memory unit 65a stores the level arrangement data Z0, Z1, . . . , Zr as values corresponding to va1, va2, . . . , va8 shown in FIG. 19A, for example, and hence level blocks L1 to L8 set therein as shown in FIG. 19A. In the fifth example, the level block settings are fixed.

An offset value Xs is written to the H direction offset register 80 by a writing control signal DHOF from the CPU 1. The offset value Xs is supplied to a position block determination processing unit 72 and an intra-position block position calculation processing unit 73.

An offset value Ys is written to the V direction offset register 81 by a writing control signal DVOF from the CPU 1. The offset value Ys is supplied to the position block determination processing unit 72 and the intra-position block position calculation processing unit 73.

The position block determination processing unit 72 and the intra-position block position calculation processing unit 73 shift a grid block forming position blocks by the offset values Xs and Ys in an H (horizontal) direction and a V (vertical) direction, respectively, and then perform position block determination processing and intra-position block position calculation processing.

As described in the first configuration example, on the basis of horizontal address data QRH and vertical address data QRV, the position block determination processing unit 72 determines a position block A[i, j] including pixel data of interest as one of position blocks A[1, 1] . . . A[p, q] within the grid block.

In the fifth configuration example, the level block determination processing unit 65 is supplied with the offset values Xs and Ys, shifts the position of the grid block relative to an image area by the offset values Xs and Ys in the horizontal direction and the vertical direction, respectively, and then determines the position block.

Figure 22A:
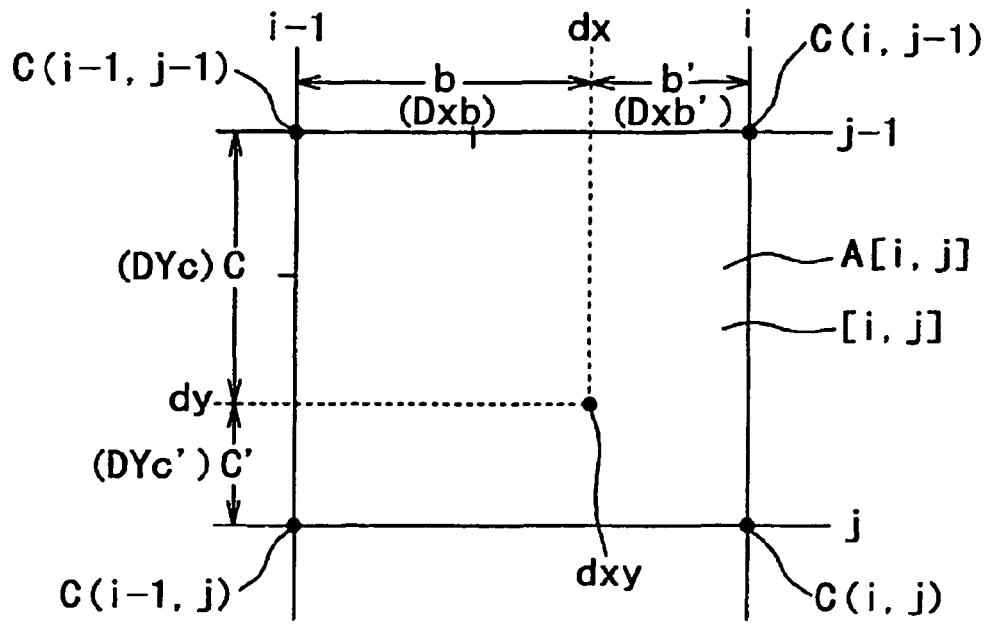
FIGS. 22A and 22B are diagrams of assistance in explaining an offset in a horizontal and a vertical direction in the fifth and a sixth configuration example of the embodiment.

Specifically, in this case, letting dx be an X coordinate of corresponding pixel dxy and dy be a Y coordinate of the corresponding pixel dxy as in FIG. 22A, when $(i-1) \leq (dx-Xs) < i$ $(j-1) \leq (dy-Ys) < j$, it is determined that the corresponding pixel dxy is included in the position block A[i, j].

Figure 22B:
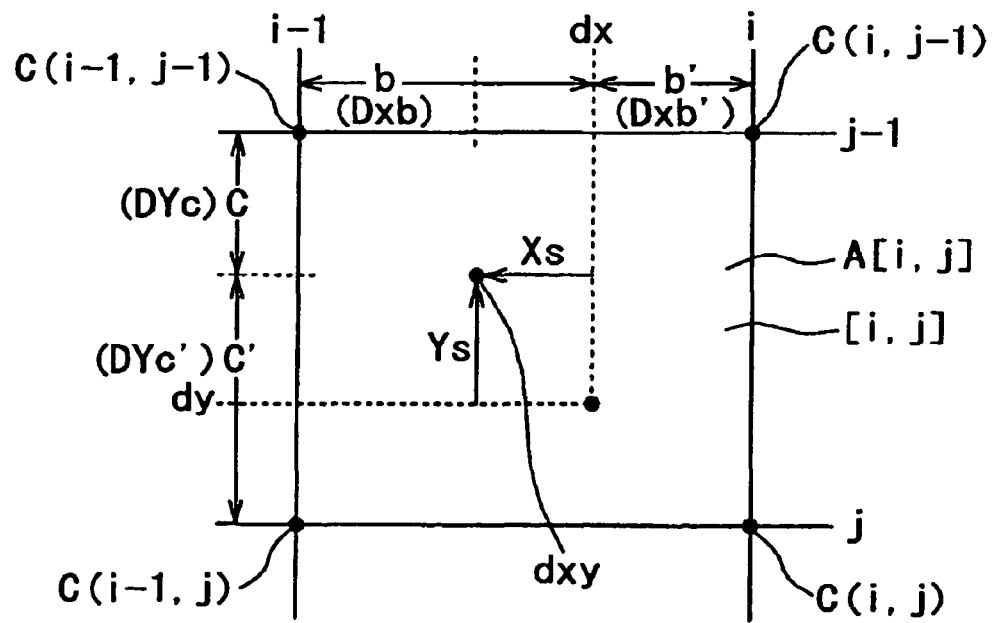

This means that the position of the corresponding pixel dxy on the grid block is shifted by the offset values Xs and Ys as shown in FIG. 22B.

Then, the position block determination processing unit 72 sends a pair of position block data DXi and DYj indicating the determined position block A[i, j] to the intra-position block position calculation processing unit 73, an intra-position block correction data forming unit 74, and a three-dimensional correction data generating unit 70.

In response to the horizontal address data QRH and the vertical address data QRV and the pair of position block data DXi and DYj indicating the determined position block A[i, j], the intra-position block position calculation processing unit 73 performs calculation processing for calculating the position of the corresponding pixel within the position block A[i, j]. At this time, the offset values Xs and Ys are also used for the calculation.

As described in the first configuration example or the like with reference to FIG. 8, for example, the processing for obtaining the information of the position of the corresponding pixel within the position block is processing for obtaining distances b, b', c, and c'. The distances b and b' become X coordinate difference data DXb and DXb'. The distances c and c' become Y coordinate difference data DYc and DYc'.

However, when the offset values Xs and Ys are given in determining the position block, the distances b, b', c, and c' (DXb, DXb', DYc, and DYc') are changed, as is understood by comparison between FIG. 22A and FIG. 22B.

The intra-position block position calculation processing unit 73 in the fifth example therefore calculates the distances b, b', c, and c' (DXb, DXb', DYc, and DYc') in FIG. 22B.

Thus, the distances b, b', c, and c' are obtained by operations:

$b = dx - Xs - (i-1)$ $b' = i - dx + Xs$ $c = dy - Ys - (j-1)$ $c' = j - dy + Ys$

Then, the X coordinate difference data DXb and DXb' indicating the X coordinate differences b and b' and the Y coordinate difference data DYc and DYc' indicating the Y coordinate differences c and c' are supplied to a three-dimensional interpolation processing unit 71.

Figure 23B:
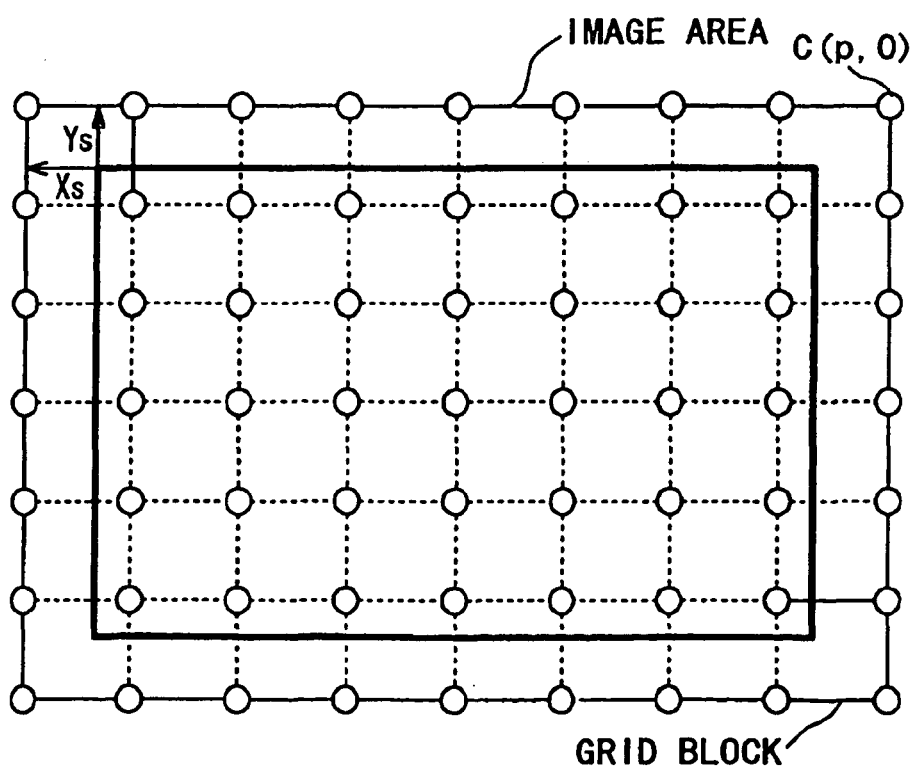

As described above, the position block determination processing unit 72 and the intra-position block position calculation processing unit 73 perform processing using the offset values Xs and Ys, whereby the relation between the grid block and the image area can be changed from a state of FIG. 23A to a state of FIG. 23B, for example.

That is, the fifth configuration example can adjust the relation between the grid block and the image area by setting the offset values Xs and Ys. Thereby the unnaturalness of the image as a result of correction of nonlinear characteristics can be eliminated even when the upper edge, the lower edge, the left edge, and the right edge of the grid block do not coincide with those of the image area owing to the resolution.

In particular, it is best for eliminating the unnaturalness of the image that the relative position relation between the grid block and the image area be changed such that an amount of displacement between the grid block and the image area is averaged in the horizontal direction or the vertical direction as shown in FIG. 23B, for example.

Further, the relation between the grid block and the image area can be adjusted only by providing the H direction offset register 80 and the V direction offset register 81. In addition, it suffices to prepare one grid block (a group of correction values in the horizontal and vertical directions). The fifth configuration example can therefore be formed by a small-scale circuit configuration and is hence highly practical.

8. Sixth Example of Configuration of Nonlinear Correction Unit

Figure 24:
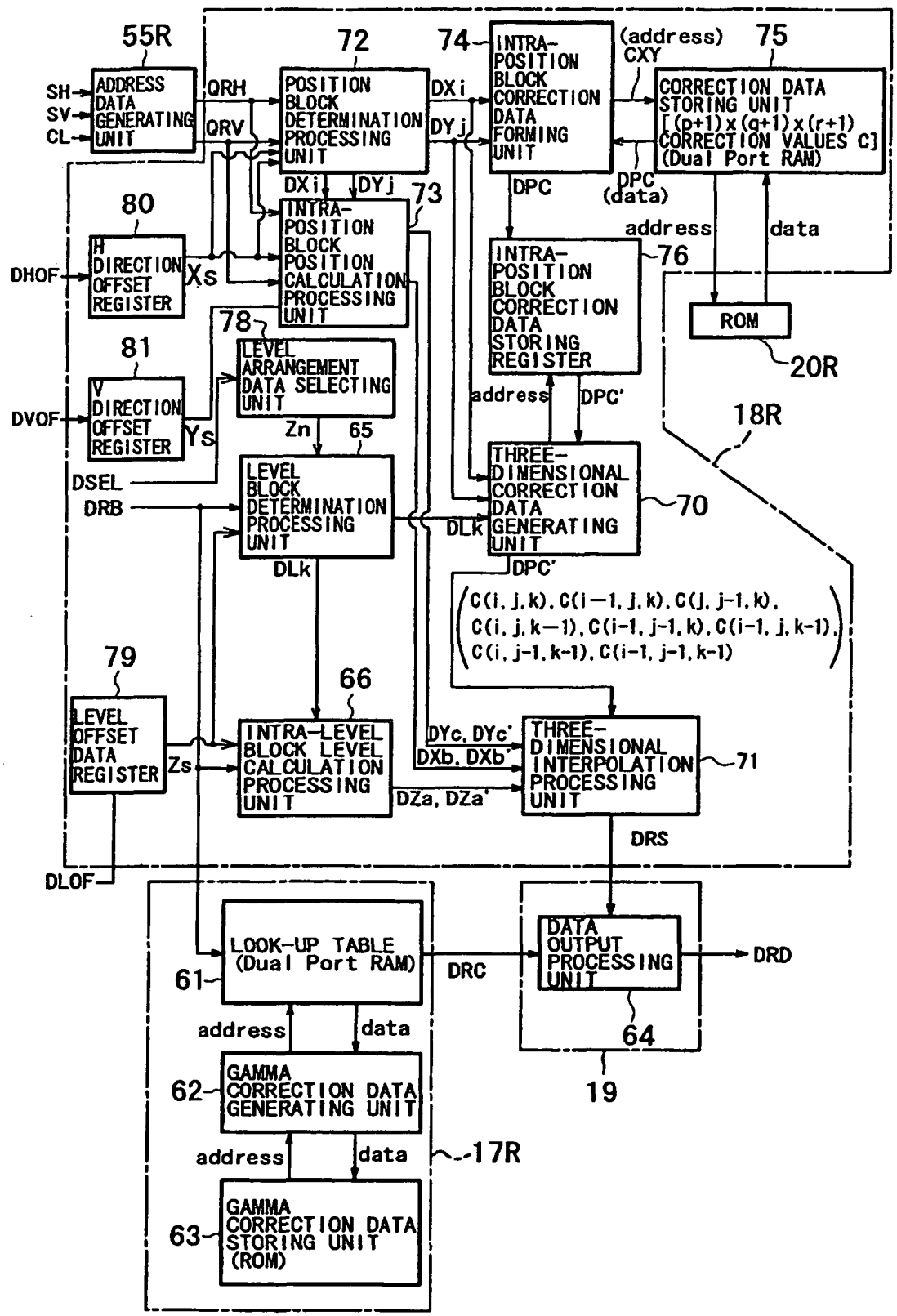
FIG. 24 is a block diagram of the sixth example of configuration of the nonlinear correction unit according to the embodiment.

A sixth configuration example is shown in FIG. 24.

The sixth configuration example is a combination of the foregoing second, third, and fifth configuration examples. Specifically, the sixth configuration example has a level arrangement data selecting unit 78 configured as shown in FIG. 17, for example, whereby level arrangement data Zn can be variably set by a selection control signal DSEL from the CPU 1.

The sixth configuration example further includes an offset data register 79. An offset value Zs is set by a writing control signal DLOF from the CPU 1, and then supplied to a level block determination processing unit 65 and an intra-level block level calculation processing unit 66, whereby level block boundary values (level arrangement data) are shifted as described in the foregoing third configuration example.

The sixth configuration example further includes an H direction offset register 80 and a V direction offset register 81.

An offset value Xs is written to the H direction offset register 80 by a writing control signal DHOF from the CPU 1. The offset value Xs is supplied to a position block determination processing unit 72 and an intra-position block position calculation processing unit 73.

An offset value Ys is written to the V direction offset register 81 by a writing control signal DVOF from the CPU 1. The offset value Ys is supplied to the position block determination processing unit 72 and the intra-position block position calculation processing unit 73.

Thereby a relative position relation between a grid block and an image area can be adjusted to a suitable state as described above.

Thus, the sixth configuration example can make appropriate level block setting in accordance with the display device or the like as in the second configuration example, and further adjust the level block setting to a more appropriate state by setting the offset value Zs as in the third configuration example. Further, unnaturalness of images can be eliminated by adjusting the relative position relation between the grid block and the image area to a suitable state as in the fifth configuration example.

While examples of configuration of the nonlinear correction unit 16 have been described above as the first to sixth configuration examples, various other examples are conceivable as the configuration of the nonlinear correction unit 16. In addition, other combinations of the first to sixth configuration examples are possible.

Further, various examples of configuration of an image display apparatus having such a nonlinear correction unit 16 are conceivable and realizable as apparatus compatible with various display devices.

INDUSTRIAL APPLICABILITY

As is understood from the above description, according to the present invention, a video signal nonlinearly processed (gamma-corrected) by nonlinear processing means is subjected to three-dimensional signal level correction using three-dimensional correction values and corresponding to a position in a horizontal direction and a vertical direction of a pixel on an image screen of an image display unit and the signal level of the pixel data. Thereby, accurate gamma correction is made possible, and since level boundary values for the signal level in the three-dimensional correction can be variably set, it is possible to make three-dimensional correction of nonlinear characteristics of various types of display devices and each individual display device with an optimum correction accuracy.

Thus, a nonlinear processing device according to the present invention can be suitably applied to image display apparatus using various types of display devices. Also, it is possible to make adjustment to an optimum three-dimensionally corrected state in each individual image display apparatus.

The nonlinear processing device further includes a register for storing a level boundary value, and by rewriting the level boundary value of the register, the level boundary value used for determination by level determining means is variably set. Thereby the setting of the level boundary value is given a very high degree of freedom, and thus optimum setting of the level boundary value is possible.

Further, level boundary setting means stores various level boundary values, and by supplying the level determining means with a level boundary value selected from the stored level boundary values, the level boundary value is set. Thereby, the variable setting of the level boundary value can be realized by a small-scale circuit configuration, and thus a highly practical nonlinear processing device is obtained.

Further, also when boundary value offsetting means for offsetting the level boundary value is provided, the variable setting of the level boundary value can be realized by a small-scale circuit configuration, and thus a highly practical nonlinear processing device is obtained.

Further, as is understood from the above description, according to the present invention, a video signal nonlinearly processed (gamma-corrected) by nonlinear processing means is subjected to three-dimensional signal level correction using three-dimensional correction values and corresponding to a position in a horizontal direction and a vertical direction of a pixel on an image screen of an image display unit and the signal level of the pixel data. Thereby, accurate gamma correction is made possible, and it is possible to dispose horizontal and vertical area information (grid block) in an optimum positional relation according to resolution of the screen. Thus, unnaturalness of an image as a result of correction of nonlinear characteristics can be eliminated even when the upper edge, the lower edge, the left edge, and the right edge of the grid block do not coincide with those of an image area. In particular, it is best that a relative position relation between the grid block and the image area be changed such that an amount of displacement between the grid block and the image area is averaged in the horizontal direction or the vertical direction.

Thus, a nonlinear processing device according to the present invention can be suitably applied to image display apparatus using display devices with various resolutions.

Further, when the nonlinear processing device is configured such that it suffices to prepare one grid block and the positional relation is changed by giving an offset in the horizontal and vertical directions, the nonlinear processing device can be formed by a small-scale circuit configuration and hence becomes highly practical.

The invention claimed is:

1. A nonlinear processing device comprising:
nonlinear processing means for correcting a video signal for signal level by nonlinear processing according to display characteristics of an image display unit for generating an image display based on the video signal;
horizontal and vertical position determining means for determining a position in a horizontal direction and a vertical direction of a pixel in said video signal;
horizontal and vertical relative position changing means for changing a relative position between horizontal and vertical area information used for determination by said horizontal and vertical position determining means and an image area of the video signal for the determination by said horizontal and vertical position determining means;
level determining means for determining signal level of the pixel in said video signal;
level boundary setting means for variably setting a level boundary value used in determination by said level determining means;
three-dimensional correction means for generating a three-dimensional signal level correction value according to the position in the horizontal direction and the vertical direction determined by said horizontal and vertical position determining means and the signal level determined by said level determining means, generating three-dimensional correction of the video signal; and
combining means for combining the video signal corrected by said nonlinear processing means with the video signal corrected by said three-dimensional correction means for output;
wherein said horizontal and vertical relative position changing means provides offset values in a horizontal and vertical directions to the horizontal and vertical position determining means, thereby the relative position relation is changed.

* * * * *